US012789886B2

(12) United States Patent
Zhang

(10) Patent No.: US 12,789,886 B2
(45) Date of Patent: Nov. 10, 2026

(54) VEHICLE STEERING SYSTEM AND VEHICLE HAVING SAME

(71) Applicant: BYD COMPANY LIMITED, Shenzhen (CN)

(72) Inventor: Peng Zhang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 496 days.

(21) Appl. No.: 18/210,550

(22) Filed: Jun. 15, 2023

(65) Prior Publication Data

US 2023/0322293 A1 Oct. 12, 2023

Related U.S. Application Data

(63) Continuation of application No. PCT/CN2021/142671, filed on Dec. 29, 2021.

(30) Foreign Application Priority Data

Dec. 30, 2020 (CN) ......................... 202011627843.6

(51) Int. Cl.
*B62D 5/04* (2006.01)
*B62D 1/181* (2006.01)
(Continued)

(52) U.S. Cl.
CPC ........... *B62D 5/0433* (2013.01); *B62D 1/181* (2013.01); *B62D 1/187* (2013.01); *B62D 1/20* (2013.01);
(Continued)

(58) Field of Classification Search
CPC ...... B62D 5/0433; B62D 1/181; B62D 1/187; B62D 1/20; B62D 5/006; B62D 5/0478;
(Continued)

(56) References Cited

U.S. PATENT DOCUMENTS 11,644,066 B2 5/2023 Capela et al.
2003/0141134 A1 7/2003 Sherwin et al.
(Continued)

FOREIGN PATENT DOCUMENTS

CN 204432743 U 7/2015
CN 207747931 U 8/2018
(Continued)

OTHER PUBLICATIONS

Espace translation of CN 211336155 U (Year: 2020).*
(Continued)

*Primary Examiner* — Vivek D Koppikar
*Assistant Examiner* — Scott Lawrence Strickler
(74) *Attorney, Agent, or Firm* — Sheppard Mullin Richter & Hampton LLP

(57) ABSTRACT

A vehicle steering system includes: a housing, and a clutch module including a first steering shaft, a steering assembly, and a drive mechanism. A part of the first steering shaft and the steering assembly are disposed in the housing. The steering assembly is configured to move between a coupling position and a decoupling position, is coupled with the first steering shaft at the coupling position and transmits a torque, and is decoupled from the first steering shaft at the decoupling position and stops the transmission of the torque. A transmission unloading mechanism is configured to unload a limiting force of the drive mechanism on the steering assembly when the steering assembly is at the coupling position, connect with the drive mechanism and the housing to enable the drive mechanism connects with the steering assembly, and drive the steering assembly to move between the coupling position and the decoupling position.

18 Claims, 19 Drawing Sheets

(51) Int. Cl.

| | |
|---|---|
| ***B62D 1/187*** | (2006.01) |
| ***B62D 1/20*** | (2006.01) |
| ***B62D 5/00*** | (2006.01) |
| ***F16D 1/10*** | (2006.01) |
| ***F16D 23/14*** | (2006.01) |

(52) U.S. Cl.

CPC ........... *B62D 5/006* (2013.01); *B62D 5/0478* (2013.01); *F16D 1/10* (2013.01); *F16D 2001/103* (2013.01); *F16D 23/14* (2013.01)

(58) Field of Classification Search

CPC ...... B62D 1/16; B62D 15/0225; B62D 5/001; F16D 1/10; F16D 23/14; F16D 2001/103

See application file for complete search history.

(56) References Cited

U.S. PATENT DOCUMENTS

| | | | | |
|---|---|---|---|---|
| 2003/0184072 | A1 | 10/2003 | Andonian et al. | |
| 2005/0155809 | A1* | 7/2005 | Krzesicki | F16D 11/04 180/407 |
| 2005/0274565 | A1 | 12/2005 | Greenwell et al. | |
| 2009/0188728 | A1 | 7/2009 | Osborne | |
| 2015/0191198 | A1 | 7/2015 | Perichon et al. | |
| 2018/0186400 | A1 | 7/2018 | Hsu et al. | |
| 2020/0130725 | A1 | 4/2020 | Ishimura et al. | |

FOREIGN PATENT DOCUMENTS

| | | | | |
|---|---|---|---|---|
| CN | 109229199 | A | 1/2019 | |
| CN | 109664932 | A | 4/2019 | |
| CN | 110696912 | A | 1/2020 | |
| CN | 110949500 | A | 4/2020 | |
| CN | 110949501 | A | 4/2020 | |
| CN | 111006886 | A | 4/2020 | |
| CN | 111017001 | A | 4/2020 | |
| CN | 210427027 | U | 4/2020 | |
| CN | 210971246 | U | 7/2020 | |
| CN | 111559420 | A | 8/2020 | |
| CN | 211336154 | U | 8/2020 | |
| CN | 211336155 | U * | 8/2020 | |
| CN | 211336156 | U | 8/2020 | |
| CN | 211494208 | U | 9/2020 | |
| CN | 111963648 | A | 11/2020 | |
| CN | 211869497 | U | 11/2020 | |
| CN | 211869498 | U | 11/2020 | |
| CN | 214112672 | U | 9/2021 | |
| DE | 102017120669 | A1 * | 3/2019 | B62D 1/181 |
| DE | 102018217506 | A1 * | 4/2020 | B62D 5/001 |
| DE | 102019132279 | A1 * | 6/2020 | B62D 1/16 |
| GB | 2579375 | A | 6/2020 | |
| JP | 2000-198453 | A | 7/2000 | |
| JP | 2001-191937 | A | 7/2001 | |
| JP | 2003048550 | A | 2/2003 | |
| JP | 2004-210200 | A | 7/2004 | |
| JP | 2006062527 | A | 3/2006 | |
| JP | 2006-193083 | A | 7/2006 | |
| JP | 2013-177045 | A | 9/2013 | |
| JP | 2017-007402 | A | 1/2017 | |
| JP | 2018-155301 | A | 10/2018 | |
| JP | 2020-069844 | A | 5/2020 | |
| JP | 2020-193658 | A | 12/2020 | |
| KR | 20100099498 | A | 9/2010 | |
| KR | 10-1491304 | B1 | 2/2015 | |
| WO | 2020/031294 | A1 | 2/2020 | |
| WO | WO-2020089199 | A1 * | 5/2020 | B62D 1/185 |

OTHER PUBLICATIONS

Espace translation of DE 10 2017 120669 A1 (Year: 2017).*

Espace translation of DE 10 2018 217506 A1 (Year: 2018).*

Espace translation of WO 2020 089199 A1 (Year: 2020).*

Espace translation of DE 10 2019 132279 A1 (Year: 2019).*

International Search Report and Written Opinion for Application No. PCT/CN2021/142671, mailed on Mar. 28, 2022, 10 pages.

Examination Report No. 1 dated Jul. 8, 2024, issued in Australian Patent Application No. 2021411029 (4 pages).

Extended European Search Report dated Jul. 11, 2024, issued in European Patent Application No. 21914539.8 (13 pages).

Notice of Reasons for Refusal dated Aug. 20, 2024, issued in Japanese Patent Application No. 2023-535998, with English machine translation (6 pages).

Request for the Submission of an Opinion dated Aug. 18, 2025, issued in Korean Patent Application No. 10-2023-7018414, with English machine translation (10 pages).

First Office Action and Search Report dated Dec. 14, 2022, issued in Chinese Patent Application No. 202011627843.6, with English machine translation (16 pages).

* cited by examiner

A-A

100

VEHICLE STEERING SYSTEM AND VEHICLE HAVING SAME

CROSS-REFERENCE TO RELATED APPLICATIONS

This application is a Continuation application of International Patent Application No. PCT/CN2021/142671, filed on Dec. 29, 2021, which is based on and claims priority to and benefits of Chinese Patent Application No. 202011627843.6 filed on Dec. 30, 2020. The entire content of all of the above-referenced applications is incorporated herein by reference.

FIELD

The present disclosure relates to the field of vehicle technologies, and more particularly, a vehicle steering system and a vehicle having the same.

BACKGROUND

In the related art, with the improvement of new functions such as an on-board multimedia function and an automatic driving function, a vehicle steering system often includes a clutch module, to realize coupling and decoupling of a steering shaft and a steering gear. However, after a long period of use, a coupling site between the steering shaft and the steering gear may wear, resulting in loose coupling and potential safety hazards during driving.

SUMMARY

The present disclosure resolves at least one of the technical problems existing in the related art. A first aspect of the present disclosure provides a vehicle steering system. The vehicle steering system can realize a tight coupling between a steering assembly and a first steering shaft, effectively improving a driving safety.

A second aspect of the present disclosure provides a vehicle having the vehicle steering system.

The vehicle steering system according to an embodiment of the present disclosure includes: a housing; a clutch module, where the clutch module includes a first steering shaft, a steering assembly, and a drive mechanism, at least a part of the first steering shaft and at least a part of the steering assembly are disposed in the housing, the steering assembly is configured to move between a coupling position and a decoupling position, the steering assembly is coupled with the first steering shaft at the coupling position and transmits a torque; and the steering assembly is decoupled from the first steering shaft at the decoupling position and stops the transmission of the torque; and a transmission unloading mechanism, where the transmission unloading mechanism is configured to be connected with the drive mechanism and the housing, the drive mechanism is connected with the steering assembly through the transmission unloading mechanism, the drive mechanism drives the steering assembly to move between the coupling position and the decoupling position through the transmission unloading mechanism, and the transmission unloading mechanism unloads a limiting force of the drive mechanism on a position of the steering assembly when the steering assembly is at the coupling position.

In the vehicle steering system according to the embodiments of the present disclosure, by configuring the transmission unloading mechanism and the drive mechanism to be connected to the steering assembly through the transmission unloading mechanism, the steering assembly can move between the coupling position and the decoupling position. The transmission unloading mechanism relieves a limiting force of the drive mechanism on a position of the steering assembly when the steering assembly is at the coupling position, so that the steering assembly can be more closely coupled with the first steering shaft in the coupling position, which can effectively improve the safety of the vehicle.

According to some embodiments of the present disclosure, the transmission unloading mechanism includes: a first adjusting connecting rod, where a first end of the first adjusting connecting rod is connected with the drive mechanism, and a second end of the first adjusting connecting rod is hinged to the steering assembly; a second adjusting connecting rod, where a first end of the second adjusting connecting rod is connected with the drive mechanism, and a second end of the second adjusting connecting rod is hinged to the steering assembly; and a longitudinal connecting rod, where a first end of the longitudinal connecting rod is hinged to the first adjusting connecting rod and the second adjusting connecting rod, a second end of the longitudinal connecting rod includes a kidney-shaped hole, and the second end of the longitudinal connecting rod is hinged to the housing through the kidney-shaped hole.

According to some embodiments of the present disclosure, a distance between centers of circles at two ends of the kidney-shaped hole is greater than 2 mm.

According to some embodiments of the present disclosure, the drive mechanism is hinged to the housing.

According to some embodiments of the present disclosure, the steering assembly includes: a second steering shaft, where at least a part of the second steering shaft is disposed in the housing, the second steering shaft is coupled to the first steering shaft and transmits the torque when the steering assembly is at the coupling position; and the second steering shaft is decoupled from the first steering shaft and stops the transmission of the torque when the steering assembly is at the decoupling position; and a clutch cylinder, where the clutch cylinder is sleeved on the second steering shaft, and the transmission unloading mechanism is connected with the clutch cylinder.

According to some embodiments of the present disclosure, the transmission unloading mechanism is the transmission unloading mechanism according to the embodiment of the present disclosure. A first hinge shaft is disposed between the second end of the first adjusting connecting rod and the steering assembly. A second hinge shaft is disposed between the second end of the second adjusting connecting rod and the steering assembly. A line connecting a central axis of the first hinge shaft to a central axis of the second hinge shaft extends through a center of the clutch cylinder.

According to some embodiments of the present disclosure, the clutch module further includes: an elastic member, where the elastic member acts on the steering assembly, and the steering assembly moves toward the first steering shaft under a combined action of the transmission unloading mechanism and the elastic member when the steering assembly is at the coupling position.

According to some embodiments of the present disclosure, the clutch module further includes: a third steering shaft, where the steering assembly is connected with the third steering shaft, the steering assembly is coupled with the third steering shaft to transmit a steering torque, and the steering assembly is configured to move with respect to the third steering shaft between the coupling position and the decoupling position.

According to some embodiments of the present disclosure, the third steering shaft includes a cavity, the steering assembly extends into the cavity; an inner circumferential surface of the third steering shaft includes multiple first splines, each of the first splines extends in an axial direction of the third steering shaft, the multiple first splines are disposed along a circumferential direction of the third steering shaft; an outer peripheral surface of the steering assembly includes multiple second splines, each of the second splines extends in an axial direction of the steering assembly, the multiple second splines are disposed along a circumferential direction of the steering assembly; and the multiple first splines are meshed with the multiple second splines.

According to some embodiments of the present disclosure, the vehicle steering system further includes: a rotation angle limiting device, where the rotation angle limiting device is connected with the steering assembly, the rotation angle limiting device defines a maximum rotation angle of the steering assembly when the steering assembly is at the decoupling position.

According to some embodiments of the present disclosure, the vehicle steering system further includes: a feeling simulator, where the feeling simulator is connected with the steering assembly; and in response to that the steering assembly is at the decoupling position, the feeling simulator is configured to simulate a feeling as the steering assembly is at the coupling position.

According to some embodiments of the present disclosure, the vehicle steering system further includes: a steering wheel adjustment device, where the steering wheel adjustment device is connected with the clutch module, and the steering wheel adjustment device is configured to adjust a height and/or a pitch angle of a steering wheel.

According to some embodiments of the present disclosure, the clutch module further includes a third steering shaft. The steering assembly is connected with the third steering shaft, the steering assembly is coupled with in the third steering shaft to transmit a steering torque, the steering assembly is configured to move with respect to the third steering shaft between the coupling position and the decoupling position, and the steering wheel is fixed to the third steering shaft; when the steering wheel adjustment device is configured to adjust at least a height of the steering wheel, the steering wheel adjustment device includes a steering wheel height adjustment device, and the steering wheel height adjustment device includes: a slidable cylinder, where the slidable cylinder is sleeved on the third steering shaft; and a height adjustment drive mechanism, where the height adjustment drive mechanism is connected with the slidable cylinder, and the height adjustment drive mechanism drives the third steering shaft to drive the steering wheel to move up and down through the slidable cylinder.

According to some embodiments of the present disclosure, the height adjustment drive mechanism includes: a height adjustment drive device, where the height adjustment drive device is fixed to the housing; a height adjustment transmission member, where the height adjustment transmission member is connected with the height adjustment drive device; and a height adjustment driving member, where the height adjustment driving member fits in with the height adjustment transmission member, and the height adjustment driving member is fixed to the cylinder to drive the cylinder to move up and down.

According to some embodiments of the present disclosure, the clutch module includes a third steering shaft. The housing is sleeved on the third steering shaft. The housing is configured to be hinged to a vehicle body of the vehicle, the steering assembly is connected with the third steering shaft, the steering assembly fits in with the third steering shaft to transmit a steering torque, the steering assembly is configured to move between the coupling position and the decoupling position relative to the third steering shaft, the steering wheel is fixed to the third steering shaft, and when the steering wheel adjustment device is configured to adjust at least a pitch angle of the steering wheel, the steering wheel adjustment device includes a steering wheel pitch angle adjustment device, and the steering wheel pitch angle adjustment device includes: a pitching adjustment drive mechanism, where the pitching adjustment drive mechanism is connected with the housing and the vehicle body; and the pitching adjustment drive mechanism drives, through the housing, the third steering shaft to drive the steering wheel to perform pitching movement.

According to some embodiments of the present disclosure, the pitching adjustment drive mechanism includes: a pitching adjustment drive device, where the pitching adjustment drive device is hinged to the housing; a pitching adjustment transmission mechanism, where the pitching adjustment transmission mechanism is connected with the pitching adjustment drive device; and a pitching adjustment connecting rod mechanism, where the pitching adjustment connecting rod mechanism is hinged to the pitching adjustment transmission mechanism, the housing, and the vehicle body.

According to some embodiments of the present disclosure, the pitching adjustment drive mechanism further includes: a fixed seat, where the fixed seat is configured to be fixed to the vehicle body, and the housing and the pitching adjustment connecting rod mechanism are respectively hinged to the fixed seat.

According to some embodiments of the present disclosure, the vehicle steering system further includes: a steering gear, connected with one of the first steering shaft and the steering assembly; and a steering wheel, connected with the other of the first steering shaft and the steering assembly.

The vehicle in an embodiment of the present disclosure includes the vehicle steering system according to any of the above embodiments of the present disclosure.

Other aspects and advantages of the present disclosure will be given in the following description, some of which will become apparent from the following description or may be learned from practices of the present disclosure.

BRIEF DESCRIPTION OF THE DRAWINGS

The foregoing and/or additional aspects and advantages of the present disclosure become apparent and comprehensible in the description of the embodiments made with reference to the following accompanying drawings.

REFERENCE NUMERALS

Figure 1:
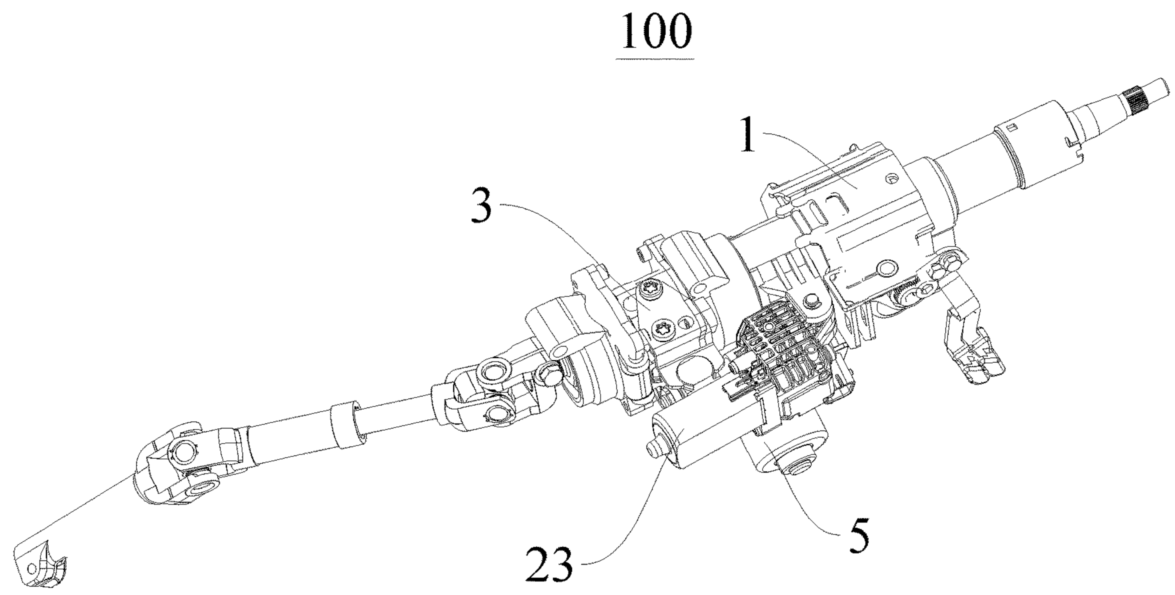
FIG. 1 is a schematic structural diagram of a vehicle steering system according to an embodiment of the present disclosure.
Figure 2:
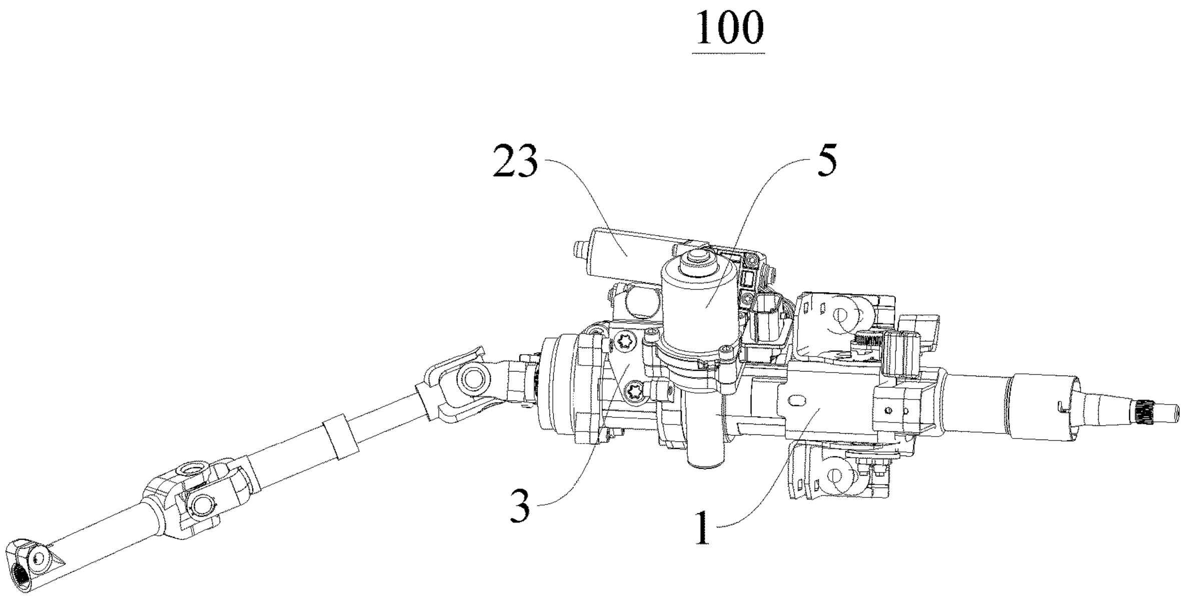
FIG. 2 is a schematic structural diagram of a vehicle steering system according to an embodiment of the present disclosure from another viewing angle.

100: Vehicle steering system; 1: Housing; 11: Sliding groove;

2: Clutch module; 21: First steering shaft; 22: Steering assembly; 221: Second steering shaft;

222: Clutch cylinder; 223: Second spline; 23: Drive mechanism; 24: Elastic member;

241: Spring base; 242: Spring sleeve; 25: Third steering shaft;

251: Bearing; 252: Cavity; 26: Lead screw; 27: Nut;

3: Transmission unloading mechanism; 31: First adjusting connecting rod; 311: First hinge shaft;

32: Second adjusting connecting rod; 321: Second hinge shaft; 33: Longitudinal connecting rod;

331: Kidney-shaped hole; 332: Third hinge shaft;
4: Rotation angle limiting device; 41: Rotating member; 411: Spiral groove; 412: First limiting structure;
42: Moving member; 421: Guide shaft; 422: Second limiting structure;
5: Feeling simulation structure; 6: Steering wheel adjustment device;
7: Steering wheel height adjustment device; 71: Slidable cylinder; 711: Extension;
72: Height adjustment drive mechanism; 721: Height adjustment drive device;
722: Height adjustment transmission member; 723: Height adjustment driving member;
7231: Height adjustment nut; 7232: Height adjustment base;
8: Steering wheel pitch angle adjustment device; 81: Pitching adjustment drive mechanism;
811: Pitching adjustment drive device; 8111: Pitching adjustment driving motor;
8112: Motor base 812: Pitching adjustment transmission mechanism; 8121: Pitching adjustment lead screw;
8122: Pitching adjustment nut; 813: Pitching adjustment connecting rod mechanism; 8131: First connecting rod;
8132: First pitching adjustment hinge point; 8133: Second pitching adjustment hinge point;
8134: Third pitching adjustment hinge point; 8135: Second connecting rod;
814: Fixed seat; and 815: Pitch hinge shaft.

DETAILED DESCRIPTION

The embodiments of the present disclosure are described in detail below, and the embodiments described with reference to accompanying drawings are some of the embodiments of the present disclosure.

A vehicle steering system 100 according to embodiments of the present disclosure is described below with reference to FIG. 1 to FIG. 40.

As shown in FIG. 5 to FIG. 8, the vehicle steering system 100 according to the embodiments of the present disclosure includes a housing 1, a clutch module 2, and a transmission unloading mechanism 3.

Figure 5:
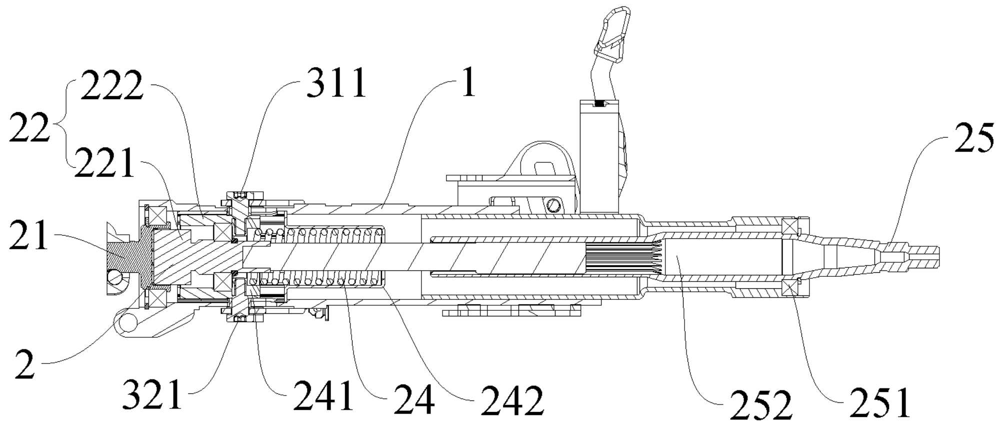
FIG. 5 is a partial cross-sectional view of a vehicle steering system according to an embodiment of the present disclosure, where a steering assembly is at a coupling position.
Figure 6:
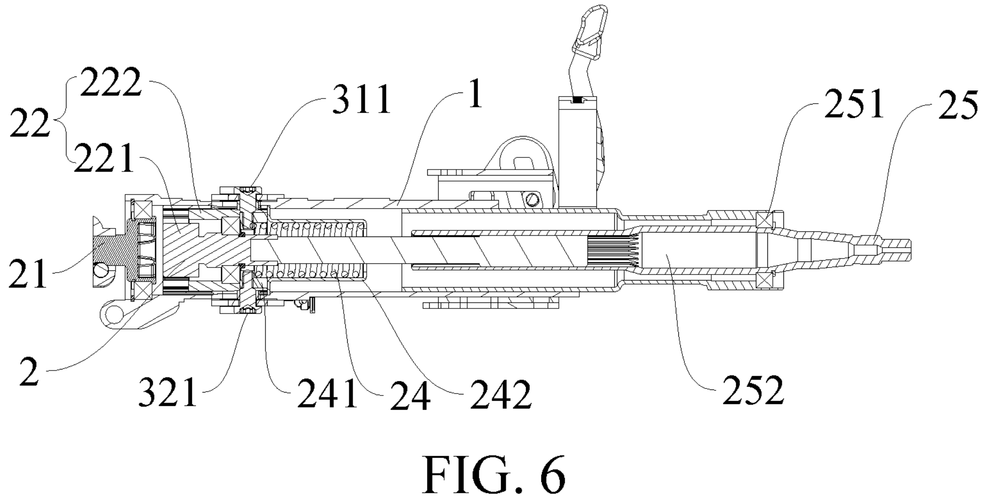
FIG. 6 is a partial cross-sectional view of a vehicle steering system according to an embodiment of the present disclosure, where a steering assembly is at a decoupling position.

With reference to FIG. 5 and FIG. 6, the clutch module 2 includes a first steering shaft 21, a steering assembly 22, and a drive mechanism 23. At least a part of the first steering shaft 21 and at least a part of the steering assembly 22 are arranged/disposed in the housing 1. Therefore, through the above arrangement/configuration, the housing 1 can effectively protect the first steering shaft 21 and the steering assembly 22, and reduce the direct contact area between the first steering shaft 21 and the steering assembly 22 and the exterior, which can prevent impurities such as external dust from affecting the normal operation of the first steering shaft 21 and the steering assembly 22, and reduces the probability of damage to the first steering shaft 21 and the steering assembly 22.

The steering assembly 22 is movable or is configured to move between a coupling position and a decoupling position. The steering assembly 22 is coupled to the first steering shaft 21 at the coupling position and transmits a torque. The steering assembly 22 is decoupled from the first steering shaft 21 at the decoupling position and stops transmission of the torque. Therefore, by the configuration of the clutch module 2, the transmitting or stopping transmission of the torque between the first steering shaft 21 and the steering assembly 22 can be realized, so that the vehicle steering system 100 can match functions such as an on-board multimedia function and an automatic driving function.

For example, a driver may control the drive mechanism 23 to drive the steering assembly 22 to move to the coupling position when driving the vehicle normally. In this case, the vehicle steering system 100 may normally transmit the torque of manipulating a steering wheel by the driver to a steering gear, so that the vehicle can turn according to the intention of the driver.

When the vehicle is in an automatic driving or parking state, the drive mechanism 23 may be controlled to drive the steering assembly 22 to move to the decoupling position. In this case, the steering wheel is disconnected from the steering gear. If the vehicle is in the automatic driving mode, the steering wheel does not rotate with the turning of the vehicle. If the vehicle is in the parking state, a game such as racing may be played on the on-board multimedia, and the game is controlled by using the steering wheel without affecting the actual steering of the vehicle.

Figure 7:
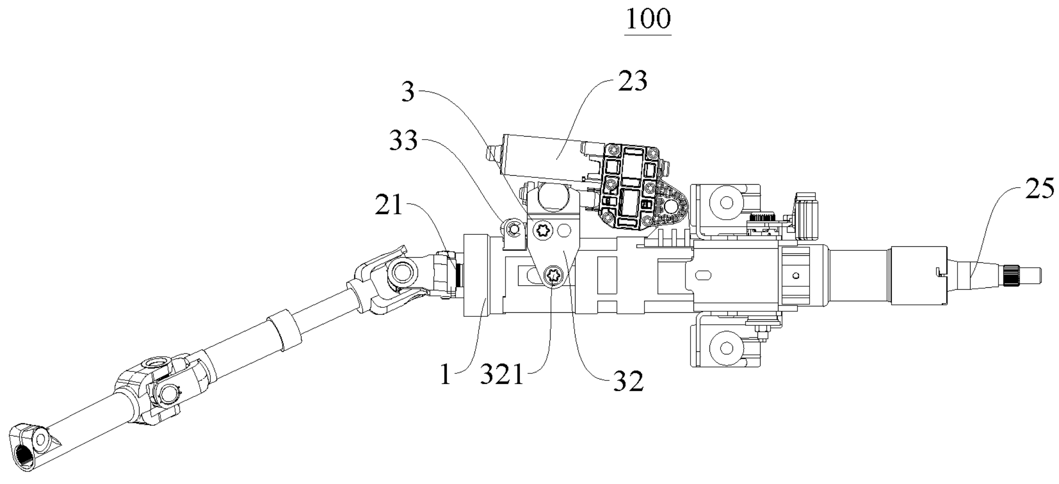
FIG. 7 is a schematic structural diagram of a vehicle steering system according to an embodiment of the present disclosure, where a steering assembly is at a decoupling position.
Figure 8:
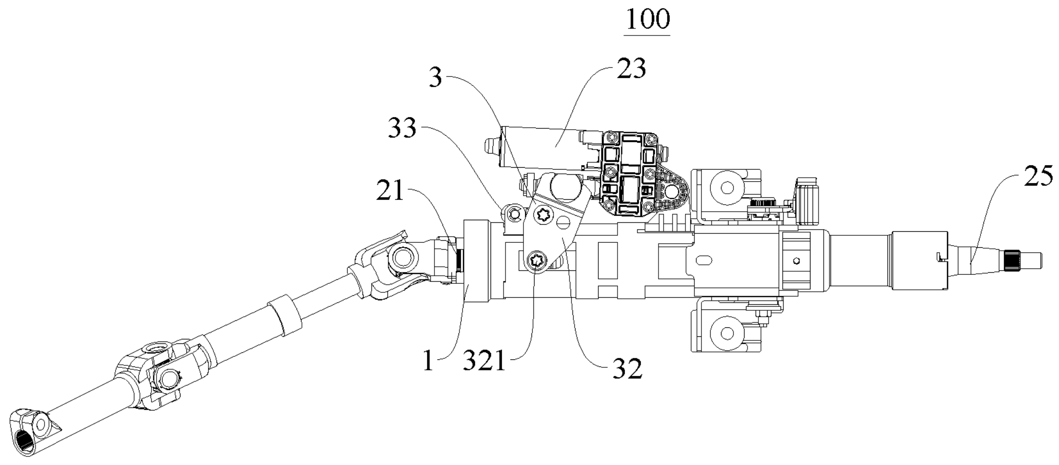
FIG. 8 is a schematic structural diagram of a vehicle steering system according to an embodiment of the present disclosure, where a steering assembly is at a coupling position.
Figure 9:
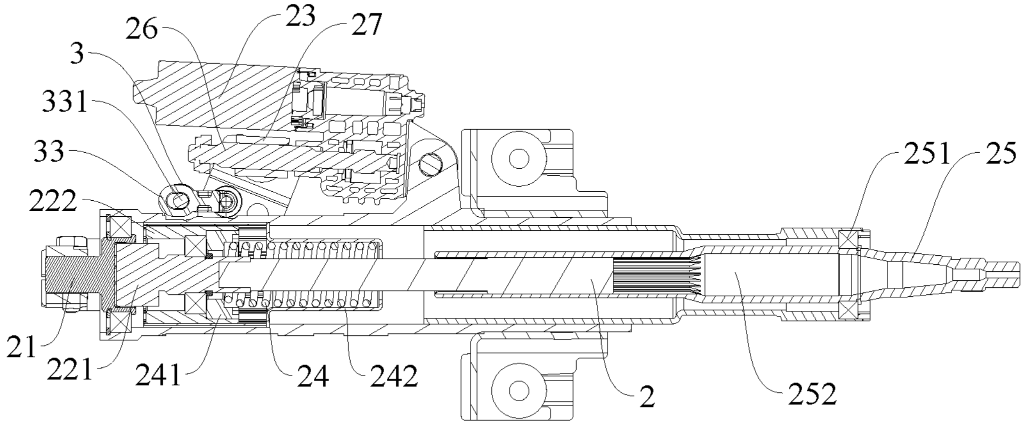
FIG. 9 is a partial cross-sectional view of a vehicle steering system according to an embodiment of the present disclosure from another viewing angle, where a steering assembly is at a coupling position.

Referring to FIG. 7 and FIG. 8, the transmission unloading mechanism 3 is configured to be connected with the drive mechanism 23 and the housing 1. The drive mechanism 23 is drive-connected to the steering assembly 22 through the transmission unloading mechanism 3, to drive the steering assembly 22 to move between the coupling position and the decoupling position. The transmission unloading mechanism 3 relieves a limiting force of the drive mechanism 23 on a position of the steering assembly 22 when the steering assembly 22 is at the coupling position. In some embodiments of the present disclosure, the transmission unloading mechanism 3 relieves a limiting force of the drive mechanism 23 on a position of the steering assembly 22.

Therefore, by the configuration of the transmission unloading mechanism 3, when the steering assembly 22 is coupled with the first steering shaft 21, the transmission unloading mechanism 3 causes the steering assembly 22 to generate a tendency to move towards the first steering shaft 21, so that the steering assembly 22 can be pressed at a position coupled with the first steering shaft 21. When the coupling between the steering assembly 22 and the first steering shaft 21 is loosened, the steering assembly 22 can continue to move towards the first steering shaft 21 and cause the coupling between the steering assembly 22 and the first steering shaft 21 is closer and more reliable, so that the torque can be effectively transmitted, which greatly improves the driving safety.

Moreover, since the drive mechanism 23 is connected to the steering assembly 22 through the transmission unloading mechanism 3, the transmission unloading mechanism 3 can play an effective driving role, causing the movement of the steering assembly 22 more reliable. The transmission unloading mechanism 3 can increase the force acting on the steering assembly 22, expand stroke of the steering assembly 22, and realize long-distance transmission of the driving force between the drive mechanism 23 and the transmission unloading mechanism 3. Therefore, a requirement for the drive mechanism 23 can be reduced, and a selection range of the drive mechanism 23 can be increased, so that the drive mechanism 23 having a low precision or a high precision can be applied, and a cost of the drive mechanism 23 can be reduced. In addition, by using the flexibility of the transmission of the transmission unloading mechanism 3, while realizing the movement of the steering assembly 22 according to a predetermined path, the disposed position of the drive mechanism 23 can be more flexible.

In the vehicle steering system 100 according to the embodiments of the present disclosure, by configuring the transmission unloading mechanism 3 and the drive mechanism 23 to be drive-connected to the steering assembly 22 through the transmission unloading mechanism 3, the steering assembly 22 is driven to move between the coupling position and the decoupling position. The transmission unloading mechanism 3 relieves a limiting force of the drive mechanism 23 on a position of the steering assembly 22 when the steering assembly 22 is at the coupling position, so that the steering assembly 22 can be more closely coupled with the first steering shaft 21 in the coupling position, which can effectively improve the safety of the vehicle.

In some embodiments of the present disclosure, referring to FIG. 7 to FIG. 10, the transmission unloading mechanism 3 includes a first adjusting connecting rod 31, a second adjusting connecting rod 32, and a longitudinal connecting rod 33. In an embodiment, one end (e.g., a first end) of the first adjusting connecting rod 31 is drive-connected to the drive mechanism 23 and the other end (e.g., a second end) of the first adjusting connecting rod 31 is hinged to the steering assembly 22. One end (e.g., a first end) of the second adjusting connecting rod 32 is drive-connected to the drive mechanism 23, and the other end (e.g., a second end) of the second adjusting connecting rod 32 is hinged to the steering assembly 22.

Therefore, a force distribution of the first adjusting connecting rod 31 and the second adjusting connecting rod 32 acting on the steering assembly 22 is relatively uniform, which further improves the stability of the movement of the steering assembly 22 between the coupling position and the decoupling position. A first hinge shaft 311 is disposed between the other end of the first adjusting connecting rod 31 and the steering assembly 22. A second hinge shaft 321 is disposed between the other end of the second adjusting connecting rod 32 and the steering assembly 22.

One end (e.g., a first end) of the longitudinal connecting rod 33 is hinged to the first adjusting connecting rod 31 and the second adjusting connecting rod 32. The other end (e.g., a second end) of the longitudinal connecting rod 33 includes a kidney-shaped hole 331. The other end of the longitudinal connecting rod 33 is hinged to the housing 1 through the kidney-shaped hole 331. In an example shown in FIG. 9 and FIG. 10*b*, a third hinge shaft 332 is disposed between the other end of the longitudinal connecting rod 33 and the housing 1. The third hinge shaft 332 extends through the kidney-shaped hole 331, and both ends of the third hinge shaft 332 protrude from the kidney-shaped hole 331 and are hinged to the housing 1. An axial direction of the kidney-shaped hole 331 may be the same as a length direction of the longitudinal connecting rod 33, and a length direction of a cross section of the kidney-shaped hole 331 may be the same as a length direction of the housing 1.

Figure 10:
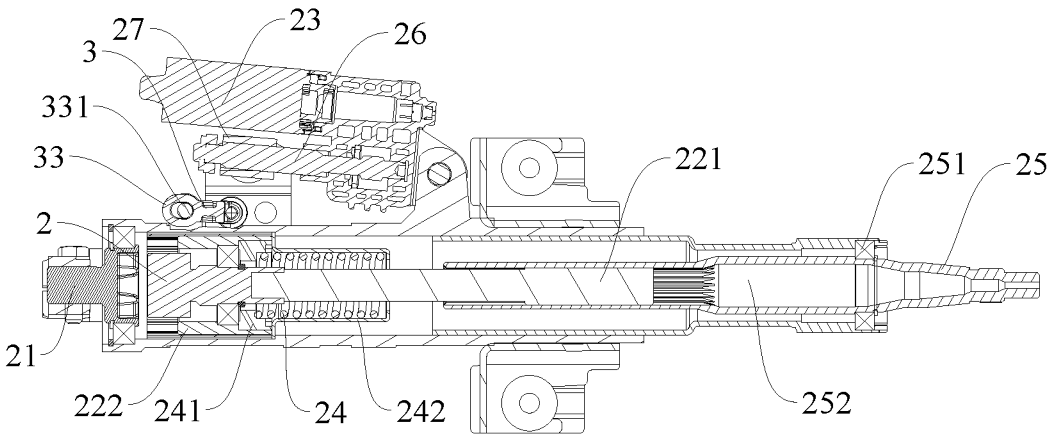
FIG. 10 is a partial cross-sectional view of a vehicle steering system according to an embodiment of the present disclosure from another viewing angle, where a steering assembly is at a decoupling position.
Figure 10A:
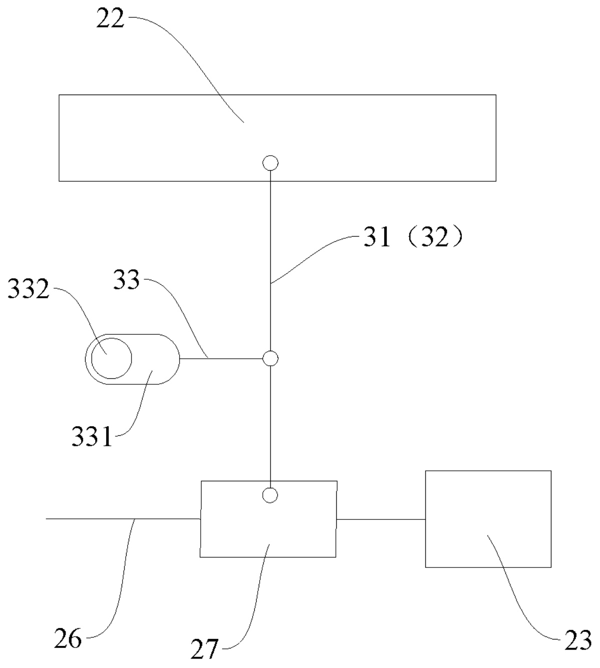
FIG. 10*a* is a schematic structural diagram of a transmission unloading mechanism of a vehicle steering system according to an embodiment of the present disclosure.
Figure 10B:
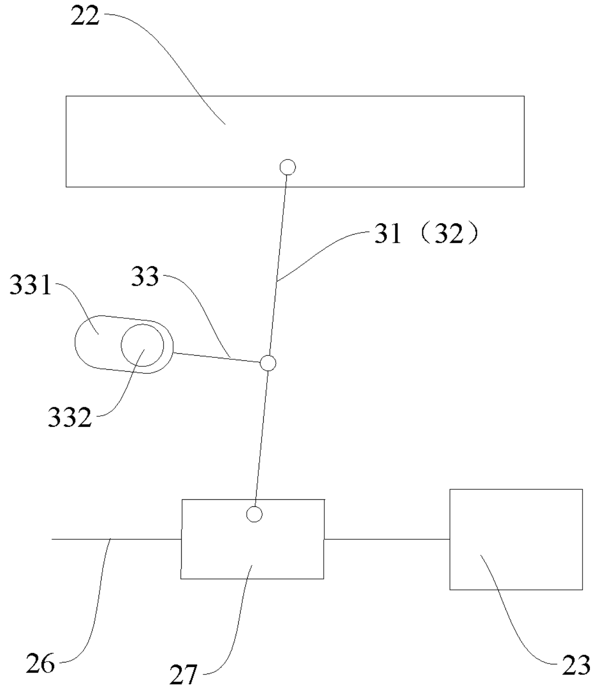
FIG. 10*b* is a schematic structural diagram of another state of the transmission unloading mechanism shown in FIG. 10*a*.
Figure 11:
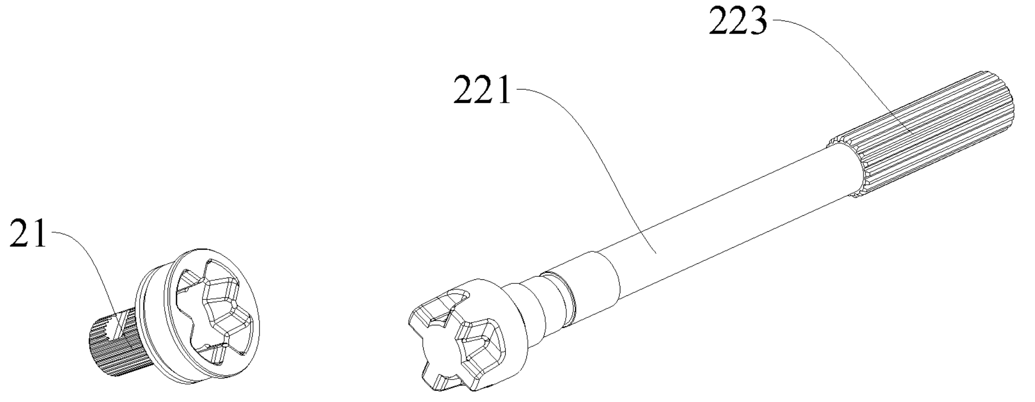
FIG. 11 is a schematic structural diagram of a steering assembly and a first steering shaft of a vehicle steering system according to an embodiment of the present disclosure.
Figure 12:
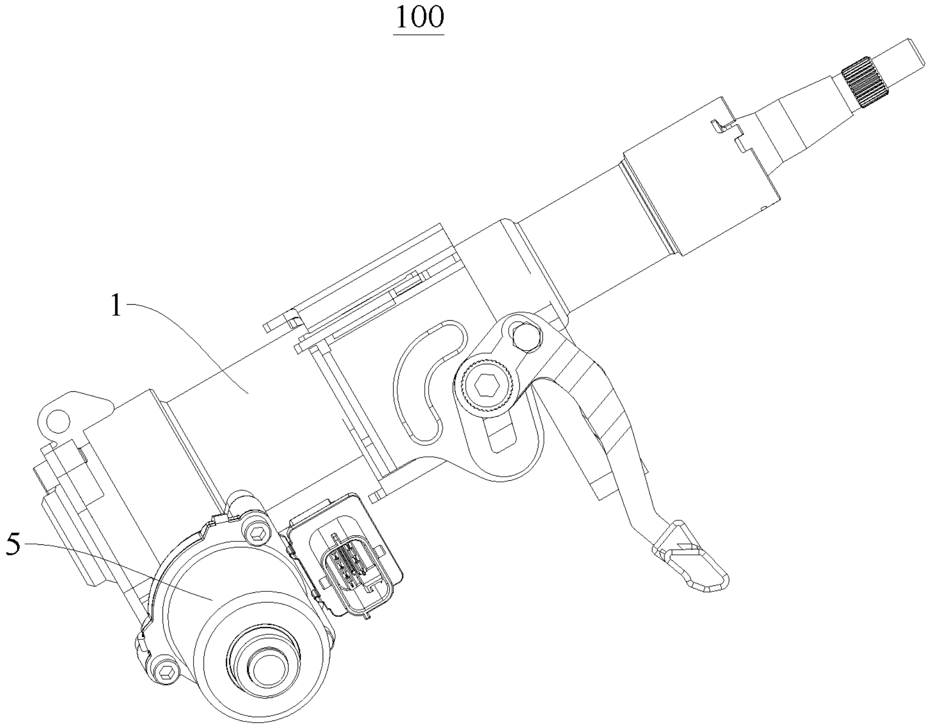
FIG. 12 is a three-dimensional view of a vehicle steering system according to another embodiment of the present disclosure.
Figure 13:
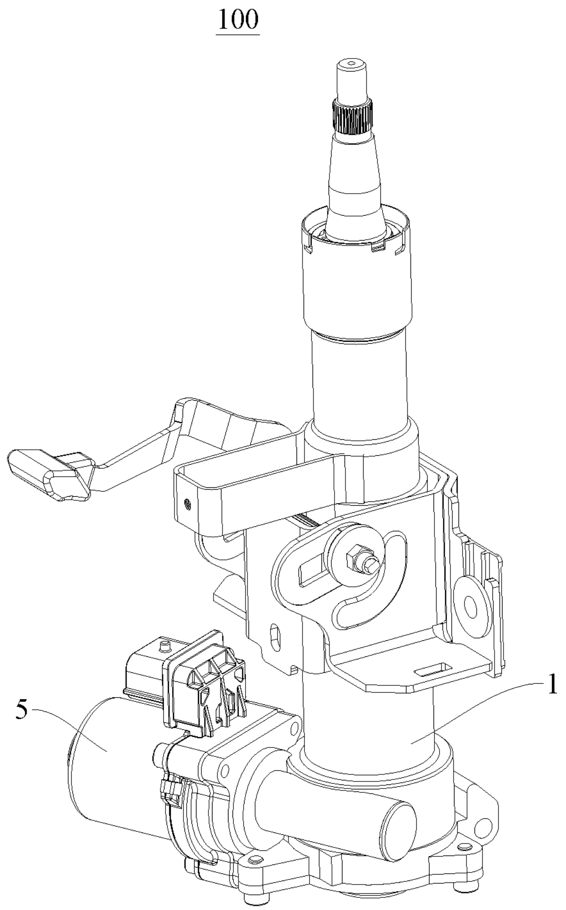
FIG. 13 is a three-dimensional view of the vehicle steering system shown in FIG. 12 from another angle.
Figure 14:
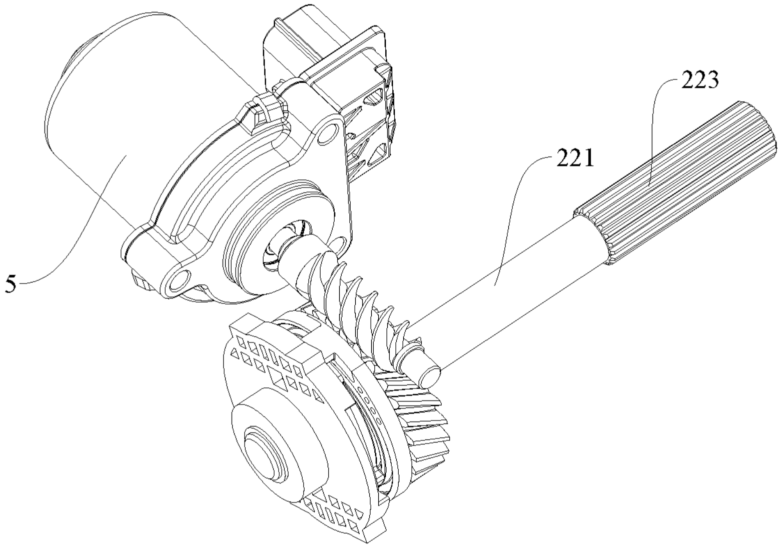
FIG. 14 is a schematic diagram of coupling of a feeling simulation structure and a steering assembly of a vehicle steering system according to an embodiment of the present disclosure.
Figure 15:
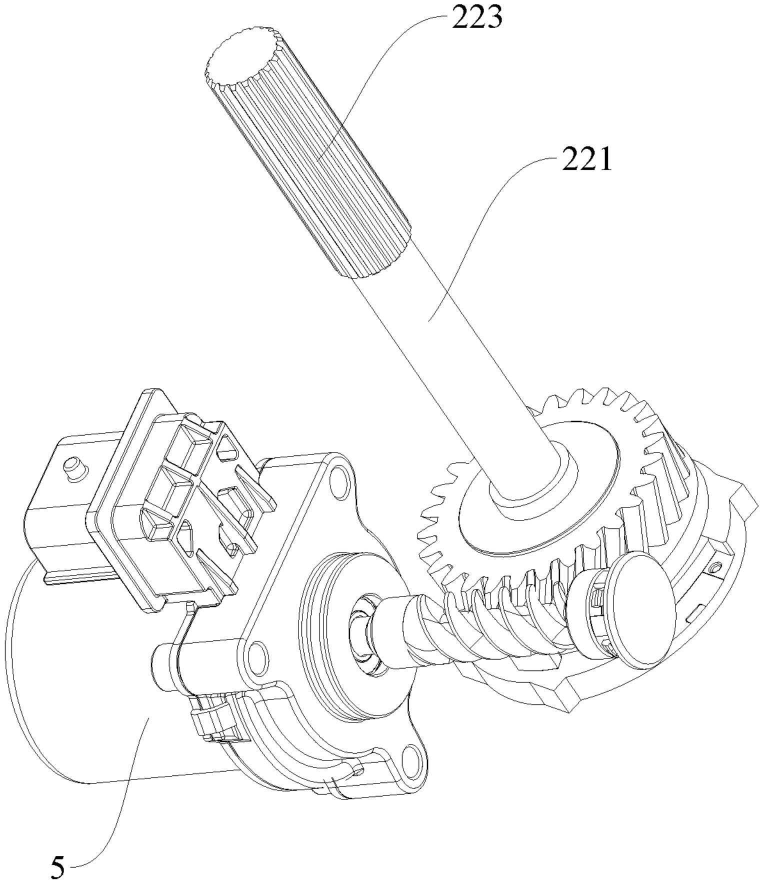
FIG. 15 is a schematic diagram of coupling of a feeling simulation structure and a steering assembly of a vehicle steering system according to an embodiment of the present disclosure from another perspective.
Figure 16:
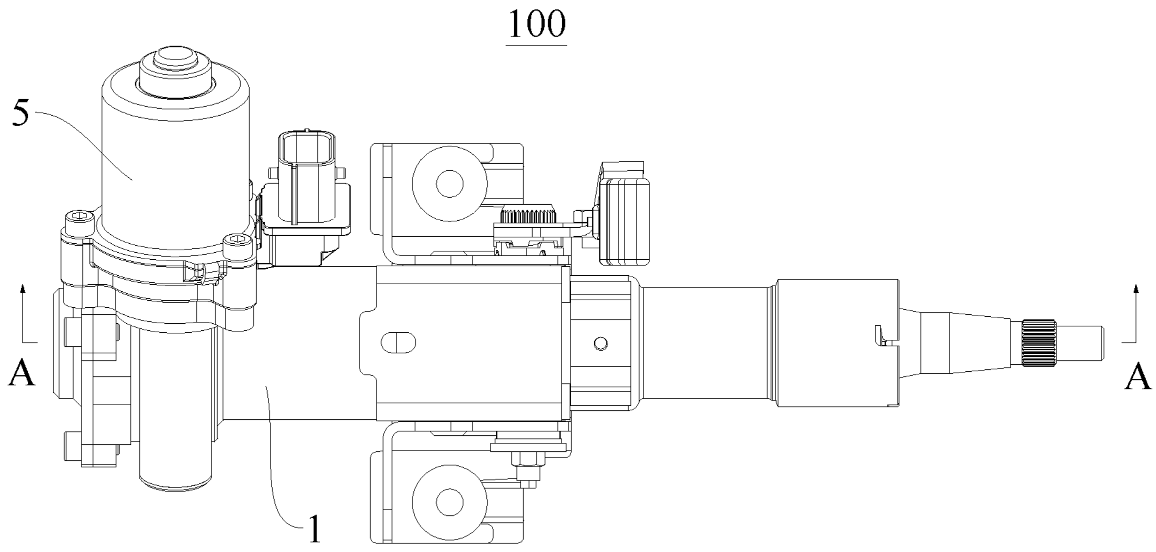
FIG. 16 is a schematic structural diagram of a vehicle steering system according to an embodiment of the present disclosure.
Figure 17:
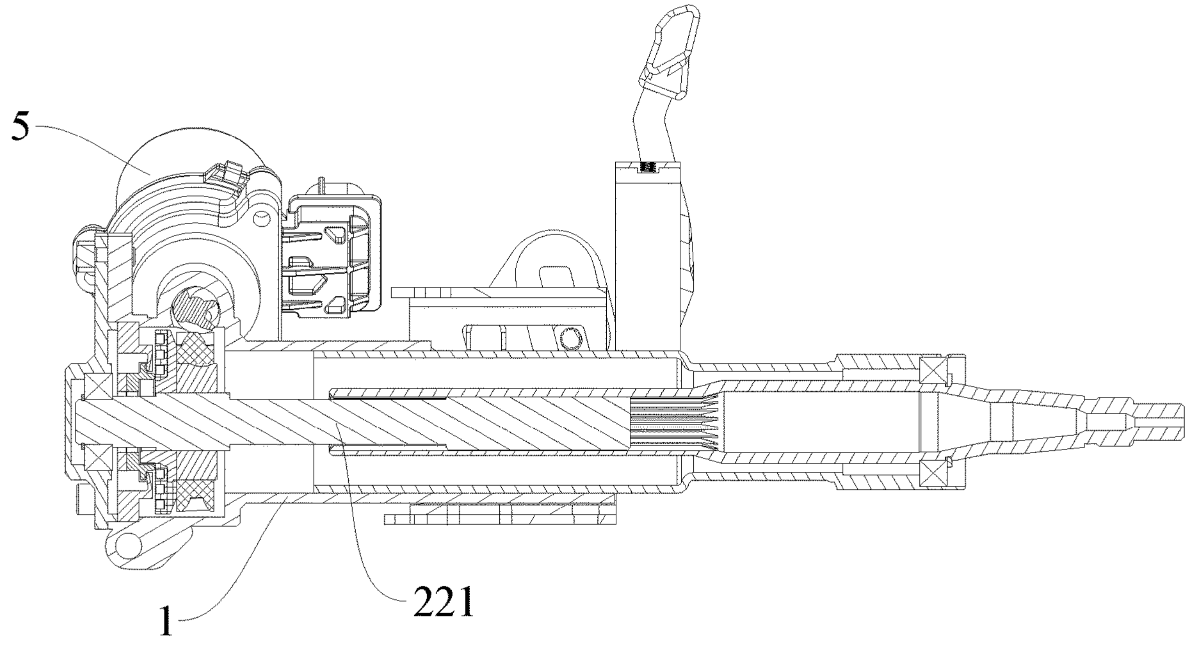
FIG. 17 is a cross-sectional view taken along line A-A in FIG. 16.
Figure 18:
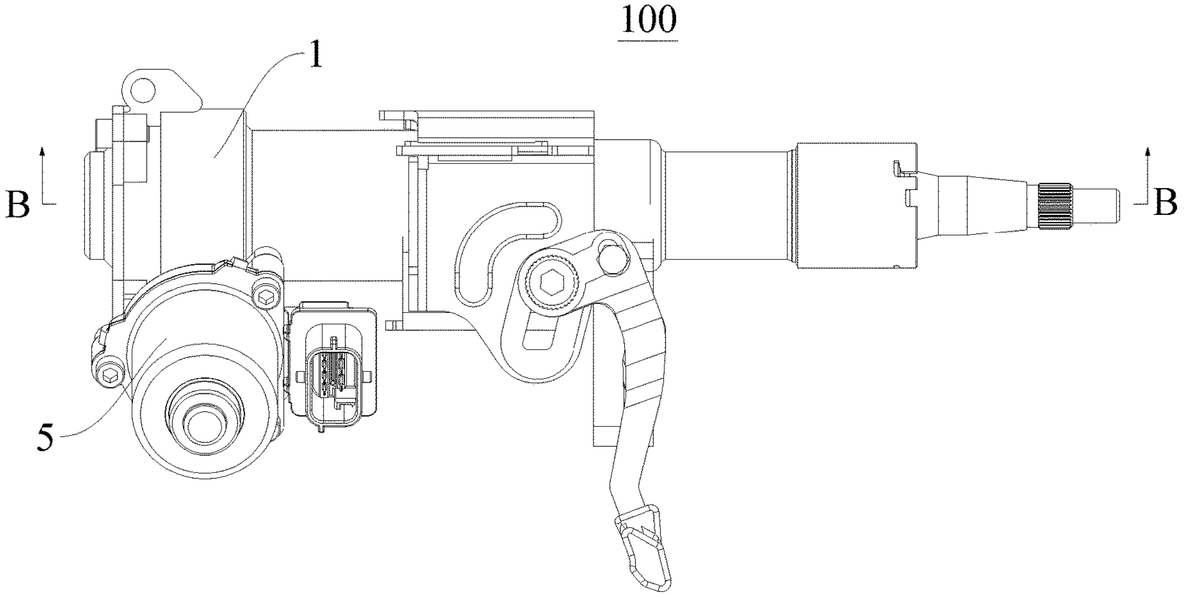
FIG. 18 is another schematic structural diagram of a vehicle steering system according to an embodiment of the present disclosure.
Figure 19:
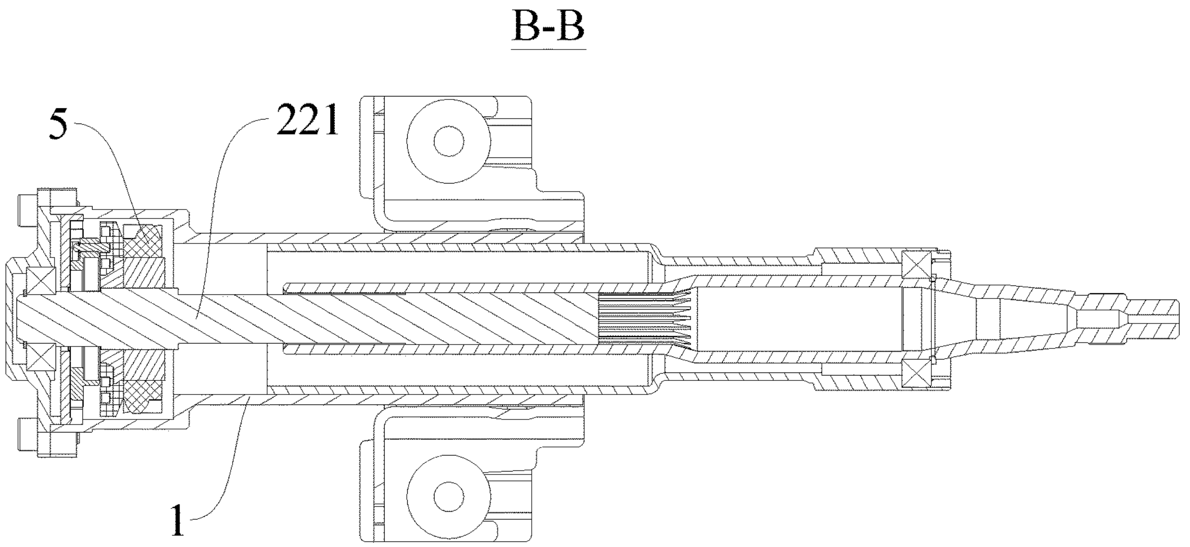
FIG. 19 is a cross-sectional view taken along line B-B in FIG. 18.
Figure 20:
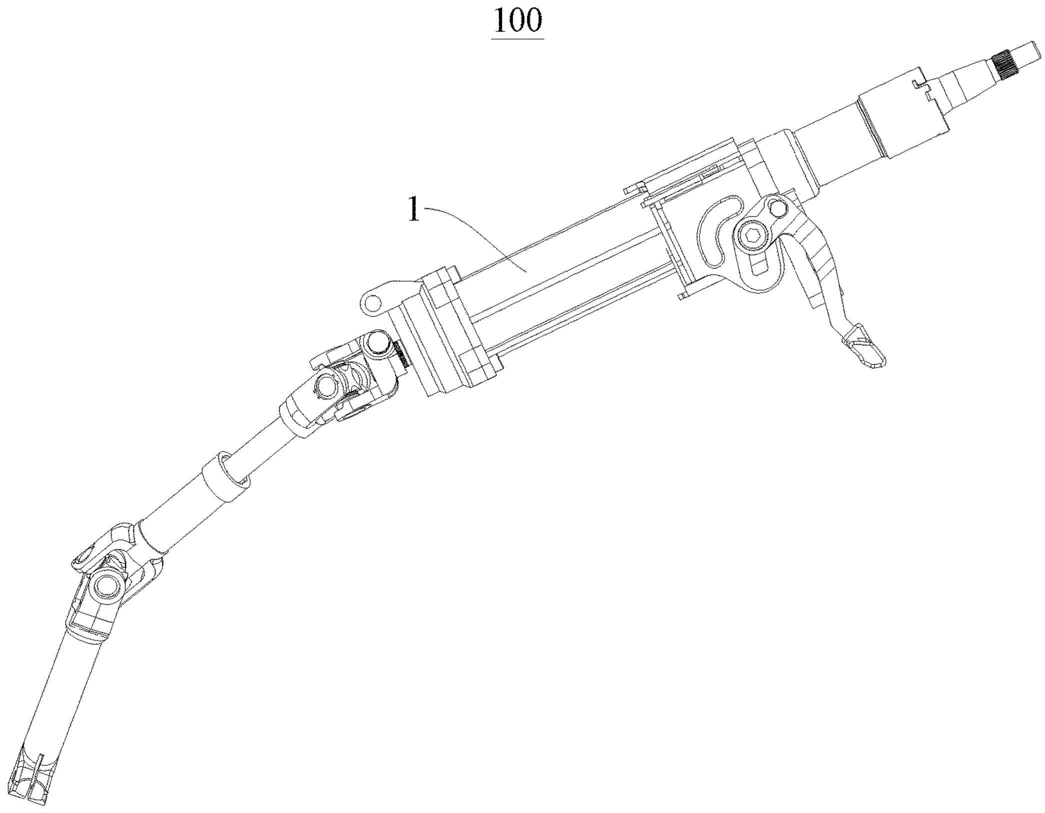
FIG. 20 is a schematic structural diagram of a vehicle steering system according to still another embodiment of the present disclosure.
Figure 21:
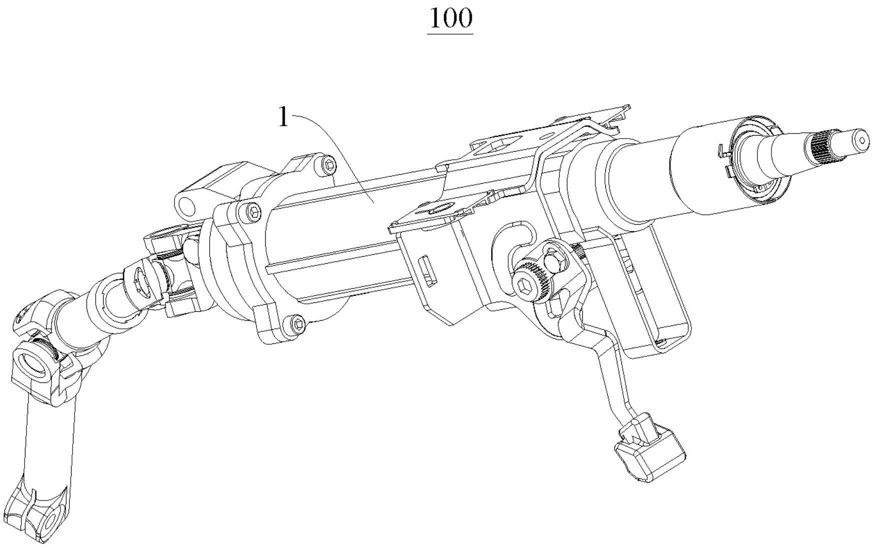
FIG. 21 is a schematic structural diagram of the vehicle steering system shown in FIG. 20 from another angle.
Figure 22:
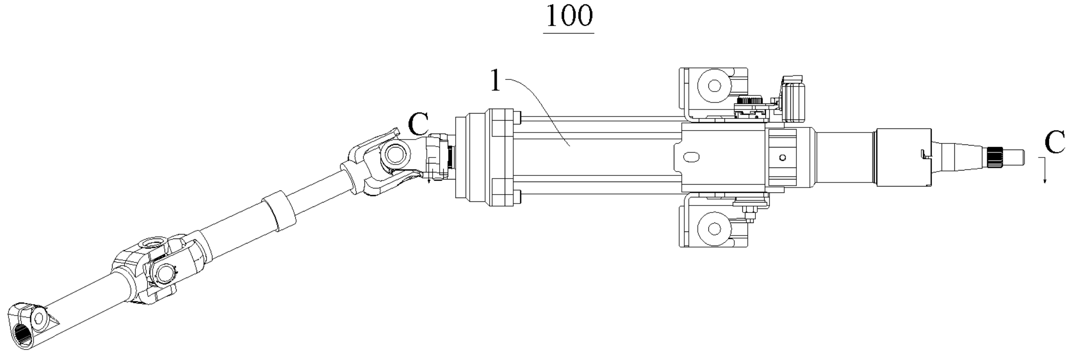
FIG. 22 is a schematic structural diagram of the vehicle steering system shown in FIG. 20 from still another angle.
Figure 23:
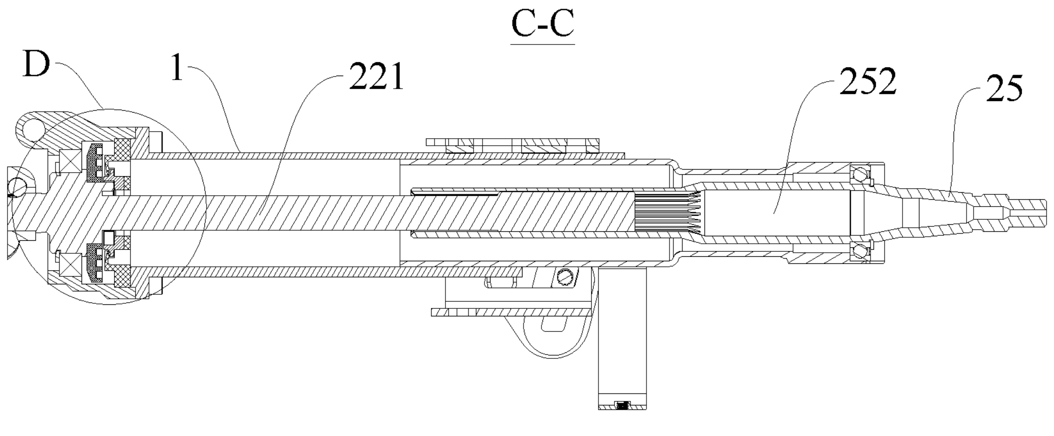
FIG. 23 is a cross-sectional view taken along line C-C in FIG. 22.
Figure 24:
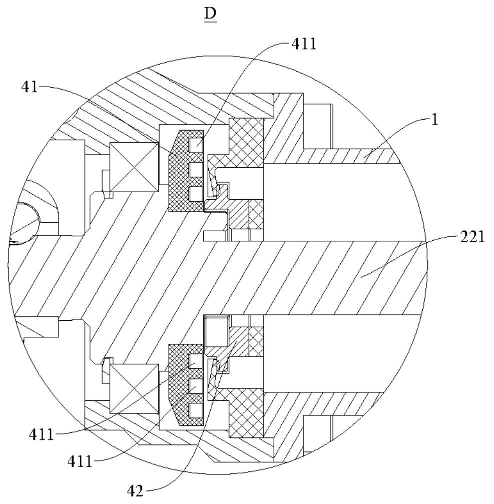
FIG. 24 is an enlarged view of portion D circled in FIG. 23.
Figure 25:
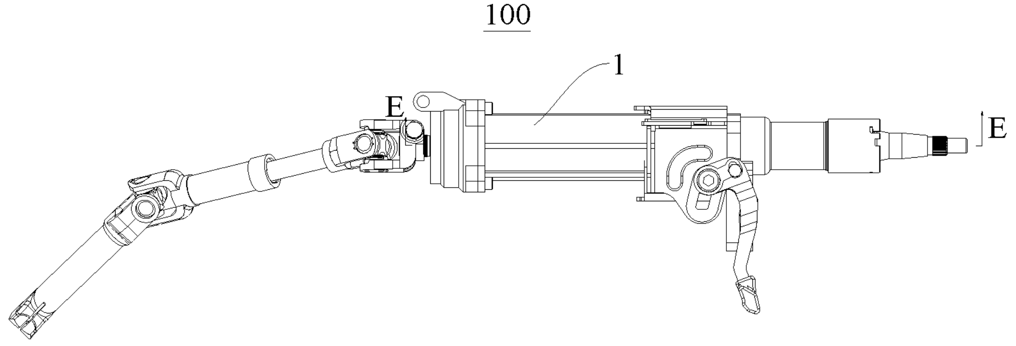
FIG. 25 is a schematic structural diagram of a vehicle steering system from another angle according to an embodiment of the present disclosure.
Figure 26:
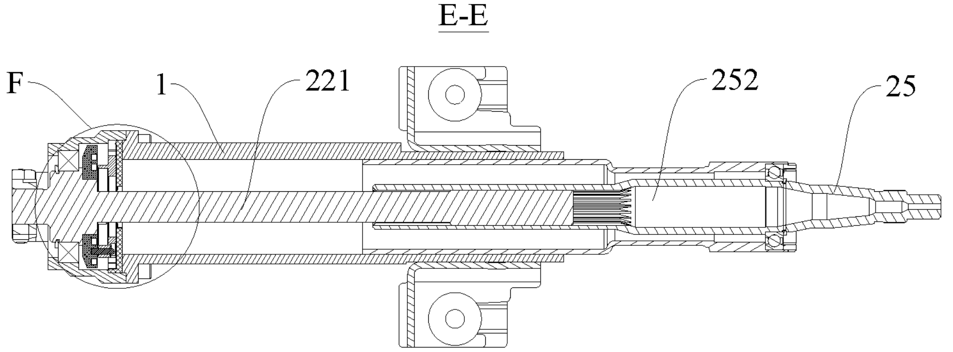
FIG. 26 is a cross-sectional view taken along line E-E in FIG. 25.
Figure 27:
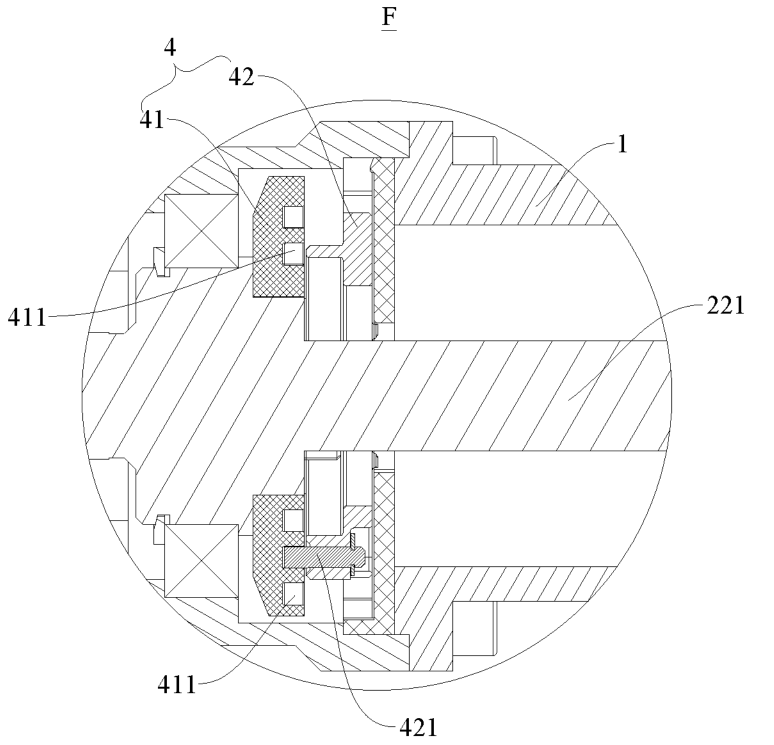
FIG. 27 is an enlarged view of portion F circled in FIG. 26.
Figure 28:
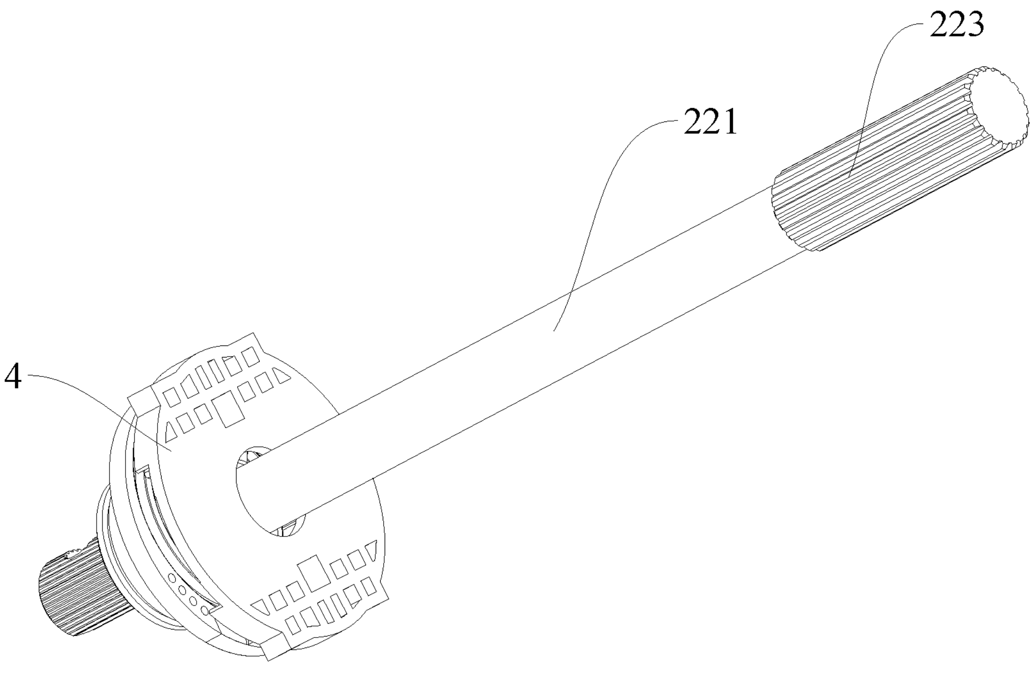
FIG. 28 is an assembly schematic diagram of a rotation angle limiting device and a second steering shaft of a vehicle steering system according to an embodiment of the present disclosure.
Figure 29:
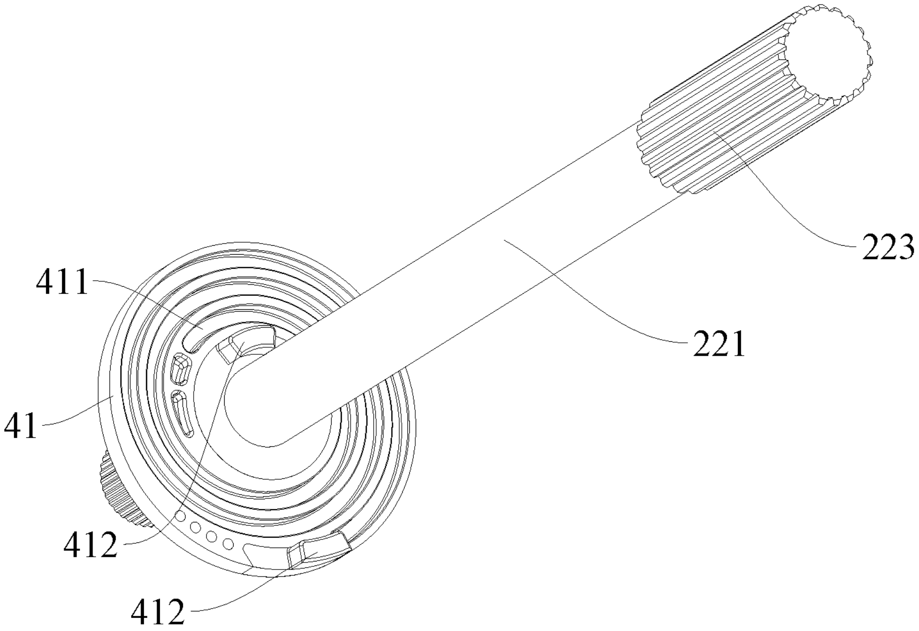
FIG. 29 is a schematic diagram of connection between a rotating member and a second steering shaft according to an embodiment of the present disclosure.
Figure 30:
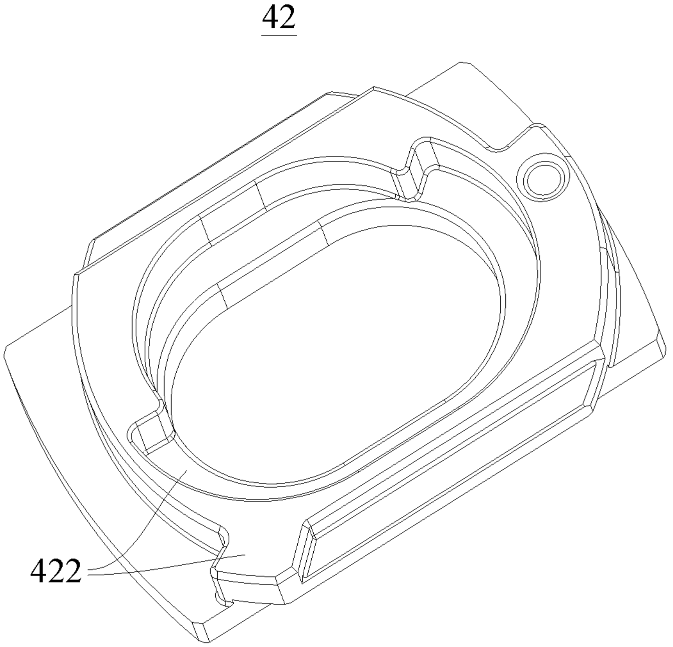
FIG. 30 is a three-dimensional view of a moving member according to an embodiment of the present disclosure.
Figure 31:
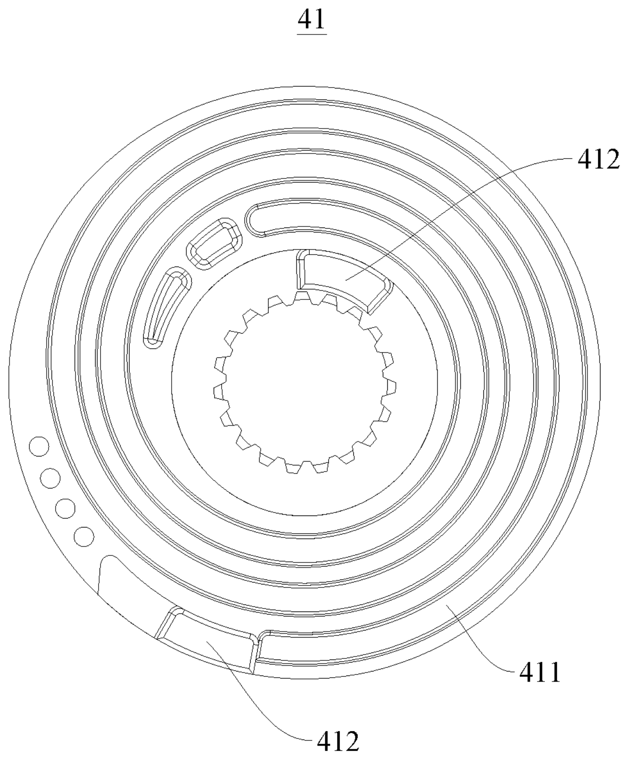
FIG. 31 is a schematic structural diagram of a rotating member according to an embodiment of the present disclosure.
Figure 32:
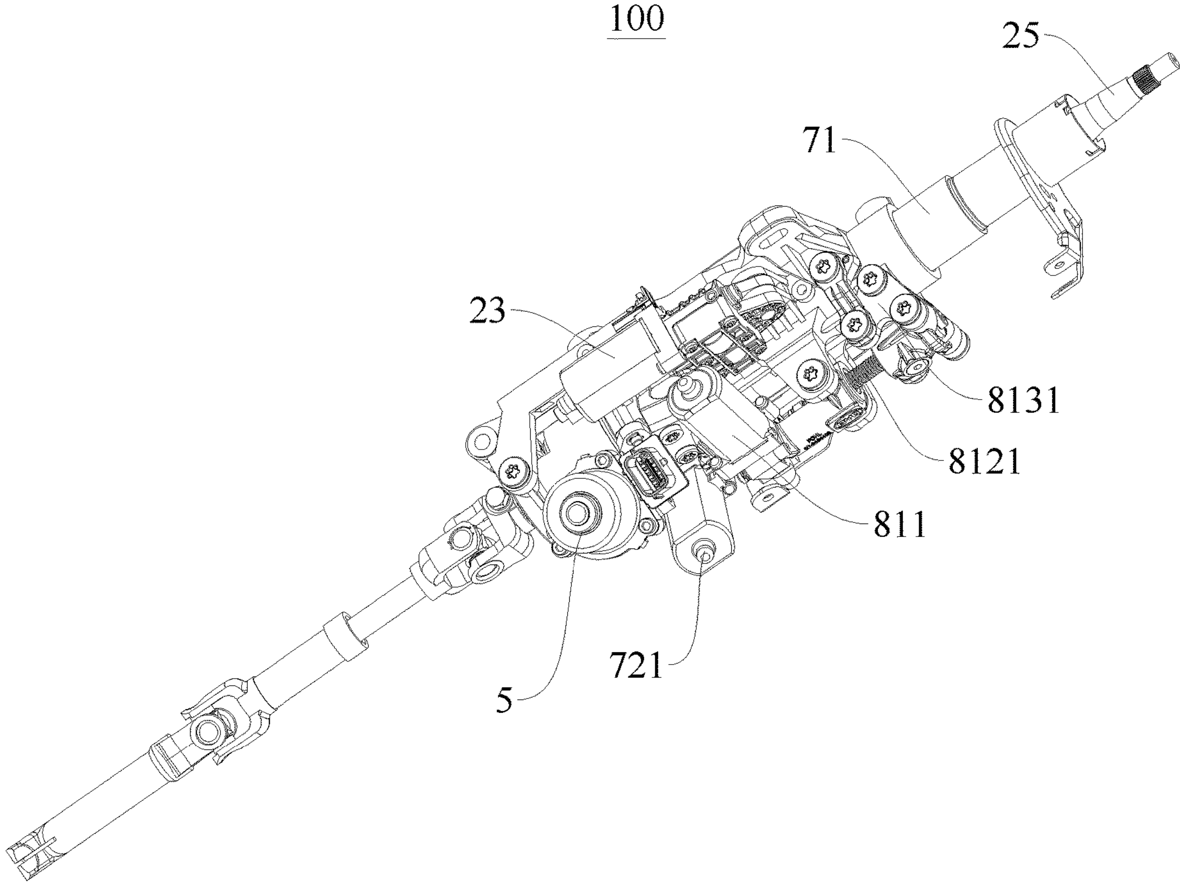
FIG. 32 is a schematic structural diagram of a vehicle steering system according to yet another embodiment of the present disclosure.
Figure 33:
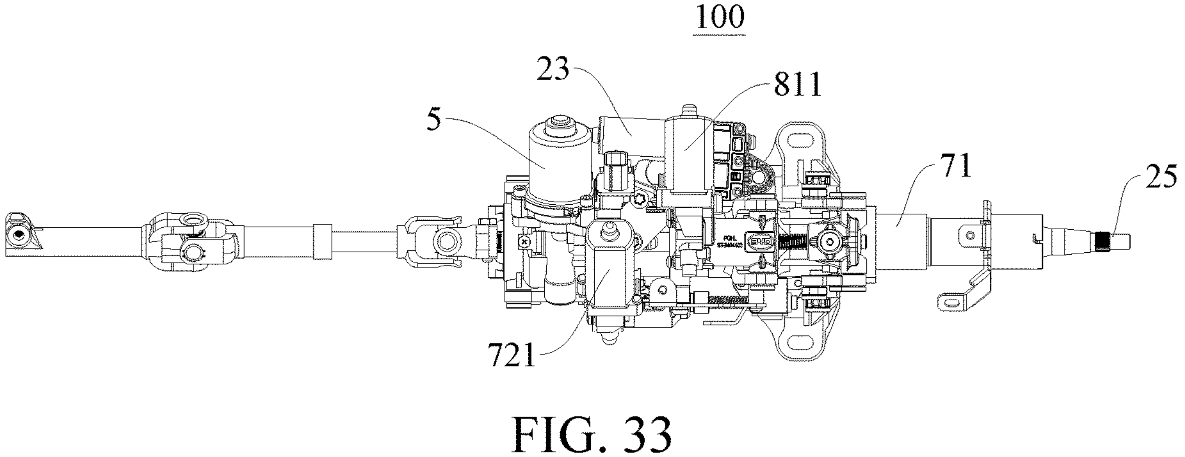
FIG. 33 is a schematic structural diagram of the vehicle steering system shown in FIG. 32 from another angle.

When the steering assembly 22 is at the decoupling position, in conjunction with FIG. 10*a*, the third hinge shaft 332 may be located at one end of the kidney-shaped hole 331 (such as, a left end in FIG. 10*a*). When the steering assembly 22 is moved from the decoupling position to the coupling position, the drive mechanism 23 can remain in the operation for a period of time. Combined with FIG. 10*b*, the first adjusting connecting rod 31, the second adjusting connecting rod 32, and the longitudinal connecting rod 33 can swing towards the first steering shaft 21 with a central axis of the first hinge shaft 311 and the second hinge shaft 321 as a rotation axis relative to the third hinge shaft 332, so that the steering assembly 22 can be driven to closely fit/couple with the first steering shaft 21 in the direction of the first steering shaft 21. In this case, the third hinge shaft 332 can move to the other end of the kidney-shaped hole 331 (such as, a right end in FIG. 10*b*), which can effectively improve the tightness and reliability of the coupling of the steering assembly 22 and the first steering shaft 21, thereby improving the reliability of the steering torque transmission.

Therefore, by arranging the kidney-shaped hole 331, the limit on the movement of the steering assembly 22 by the first adjusting connecting rod 31 and the second adjusting connecting rod 32 can be effectively eliminated, and further travel can be reserved for the movement of the steering assembly 22 towards the direction of the first steering shaft 21. The tightness of the first steering shaft 21 and the steering assembly 22 can be further ensured. A distance between centers of waist circles at two ends of the kidney-shaped holes 331 is greater than 2 mm, for example, the distance may be 3 mm, thereby allowing the sufficient travel for the movement of the steering assembly 22 towards the direction of the first steering shaft 21 to further ensure the tightness of the coupling of the steering assembly 22 with the first steering shaft 21.

In an embodiment, in conjunction with FIG. 9, FIG. 10, FIG. 10*a*, and FIG. 10*b*, the clutch module 2 further includes a lead screw 26 and a nut 27. The lead screw 26 is drive-connected to the drive mechanism 23. The nut 27 is sleeved on the lead screw 26 and threads with the lead screw 26. The end of the first adjusting connecting rod 31 and the end of the second adjusting connecting rod 32 are hinged to the nut 27. As a result, the drive mechanism 23 can drive the lead screw 26 to rotate. Since the lead screw 26 is threaded to the nut 27, the nut 27 moves along an axial direction of the lead screw 26 when the lead screw 26 is rotated, and the nut 27 drives the first adjusting connecting rod 31 and the second adjusting connecting rod 32 to swing, which drives the steering assembly 22 to move along the axial direction.

In some embodiments of the present disclosure, as shown in FIG. 7 and FIG. 8, the longitudinal connecting rod 33 is hinged between two ends of the first adjusting connecting rod 31 and two ends of the second adjusting connecting rod 32. A hinge joint between the longitudinal connecting rod 33 and the first adjusting connecting rod 31 in a length direction of the first adjusting connecting rod 31 is at the same position as a hinge joint between the longitudinal connecting rod 33 and the second adjusting connecting rod 32 in a length direction of the second adjusting connecting rod 32. In this way, the assembly is simpler, and the amplitude of movement of the first adjusting connecting rod 31 and the second adjusting connecting rod 32 is the same, so as to ensure that the steering assembly 22 can move along the axial direction, and the movement fluency of the steering assembly 22 can be improved.

In an embodiment, in combination with FIG. 7 to FIG. 10, the drive mechanism 23 can be hinged to the housing 1. In this way, the connection between the drive mechanism 23 and the housing 1 is simple, the structure is relatively compact, and a certain relative rotation can occur between the drive mechanism 23 and the housing 1.

In some embodiments of the present disclosure, as shown in FIG. 5 and FIG. 6, the steering assembly 22 includes a second steering shaft 221 and a clutch cylinder 222. In an embodiment, at least a part of the second steering shaft 221 is arranged/disposed in the housing 1. The steering assembly 22 couples the second steering shaft 221 to the first steering shaft 21 at the coupling position and transmits the torque. The second steering shaft 221 is decoupled from the first steering shaft 21 when the steering assembly 22 is in the decoupling position and the transmission of the torque is disconnected. The clutch cylinder 222 is sleeved on the second steering shaft 221. The transmission unloading mechanism 3 is connected to the clutch cylinder 222.

In an example shown in FIG. 5 and FIG. 6, a line between a central axis of the first hinge shaft 311 and a central axis of the second hinge shaft 321 extends through a center of a cross section of clutch cylinder 222. In this way, an arm of force between the first hinge shaft 311 and the clutch cylinder 222 and an arm of force between the second hinge shaft 321 and the clutch cylinder 222 are in a same line. That is to say, an overall torque of the clutch cylinder 222 may be symmetrical with respect to the central axis, and the torque that deviates a direction of the movement of the clutch cylinder 222 from the axial direction can be eliminated. That is, an inversion torque of the clutch cylinder 222 is eliminated, and the clutch cylinder 222 is ensured to drive the second steering shaft 221 to move along the axial direction, which increases the movement fluency of the clutch cylinder 222 and avoids a stuck situation when the clutch cylinder 222 moves. It should be noted that the cross section of the clutch cylinder 222 refers to a cross section perpendicular to the axial direction of the clutch cylinder 222.

For example, a plane where a certain cross section of the clutch cylinder 222 is located passes through the central axis of the first hinge shaft 311 and the central axis of the second hinge shaft 321 at the same time, and the line between the central axis of the first hinge shaft 311 and the central axis of the second hinge shaft 321 passes through the center of the cross section. A distance between the first hinge shaft 311 and a hinge point of the clutch cylinder 222 to the center of the cross section is a first distance, and a distance between the second hinge shaft 321 and a hinge point of the clutch cylinder 222 and the center of the cross section is a second distance. The first distance and the second distance may be the same.

Therefore, by setting the second steering shaft 221 and the clutch cylinder 222, the transmission unloading mechanism 3 can drive the second steering shaft 221 to couple or decouple the first steering shaft 21 through the clutch cylinder 222. When the steering assembly 22 is in the coupling position, the transmission unloading mechanism 3 can press the second steering shaft 221 to the coupling position with the first steering shaft 21 through the clutch cylinder 222. When the second steering shaft 221 is closely coupled to the first steering shaft 21, a direct contact between the transmission unloading mechanism 3 and the second steering shaft 221 is not required, so that a service life of the second steering shaft 221 can be extended, and the stability of the movement of the second steering shaft 221 can be guaranteed.

Figure 3:
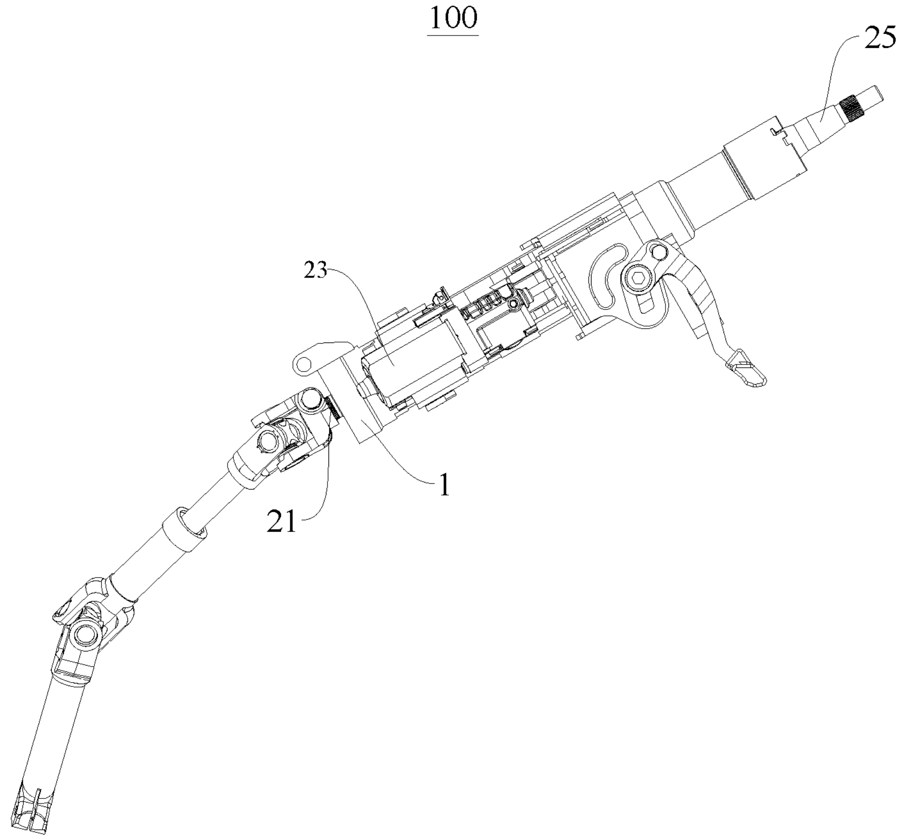
FIG. 3 is a schematic structural diagram of a vehicle steering system according to an embodiment of the present disclosure.
Figure 4:
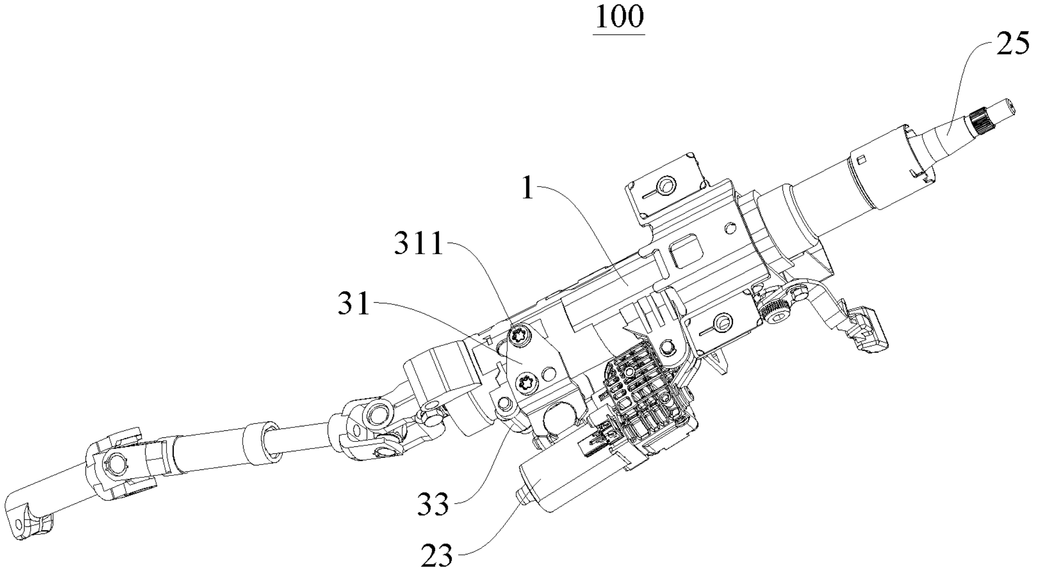
FIG. 4 is a schematic structural diagram of a vehicle steering system from another perspective according to an embodiment of the present disclosure.

In some embodiments of the present disclosure, as shown in FIG. 3 and FIG. 4, the cross section of the clutch cylinder 222 can be circular, and the first hinge shaft 311 and the second hinge shaft 321 are arranged/disposed relative to each other in a radial direction of the clutch cylinder 222. In this way, the shape of the clutch cylinder 222 is regular, which is convenient for the production and processing, disassembly, and replacement. In addition, the overall force of the clutch cylinder 222 is uniform in this case, and the movement fluency of the clutch cylinder 222 can be further ensured while avoiding the stress concentration. Certainly, it may be understood that the cross section of the clutch cylinder 222 may also be other shapes, such as square or the like.

In a further embodiment of the present disclosure, referring to FIG. 5, FIG. 6, FIG. 9, and FIG. 10, the clutch module 2 further includes an elastic member 24. The elastic member 24 acts on the steering assembly 22. The steering assembly 22 continues to move in a direction of the first steering shaft 21 under a joint action of the transmission unloading mechanism 3 and the elastic member 24 when the steering assembly 22 is at the coupling position.

In an example shown in FIG. 5, FIG. 6, FIG. 9, and FIG. 10, the elastic member 24 is a spring sleeved on the second steering shaft 221. A spring base 241 and a spring sleeve 242 are sleeved on the second steering shaft 221. One end of the elastic member 24 abuts against the spring base 241 and the other end abuts against the spring sleeve 242. Therefore, the elastic member 24 can provide the elastic force that often pushes the steering assembly 22 to the coupling position. On the one hand, the thrust of the steering assembly 22 to move to the coupling position can be increased, thereby improving the fluency of the steering assembly 22 to move to the coupling position. On the other hand, when the steering assembly 22 is in the coupling position, the transmission unloading mechanism 3 can cause the elastic force of the elastic member 24 act on the steering assembly 22, to ensure that the coupling between the steering assembly 22 and the first steering shaft 21 is closer, stable, and does not require energy consumption, and the coupling angle can be more accurate.

In some embodiments of the present disclosure, as shown in FIG. 5, FIG. 6, FIG. 9, and FIG. 10, the clutch module 2 further includes a third steering shaft 25. The steering assembly 22 is connected to the third steering shaft 25. The steering assembly 22 is engaged with the third steering shaft 25 to transmit a steering torque. That is to say, the steering assembly 22 and the third steering shaft 25 are rotated synchronously to transmit the steering torque, and the steering assembly 22 is axially movable or configured to move relative to the third steering shaft 25, so that the steering assembly 22 is movable relative to the third steering shaft 25 between the coupling position and the decoupling position. In this way, both the steering torque transmission between the steering assembly 22 and the third steering shaft 25 can be realized, and the axial movement of the steering assembly 22 relative to the third steering shaft 25 can be realized, so that the steering assembly 22 is switchable between the coupling position and the decoupling position.

In some embodiments of the present disclosure, referring to FIG. 5, FIG. 6, FIG. 9, and FIG. 10, the third steering shaft 25 may be constructed with a cavity 252, and the steering assembly 22 extends into the cavity 252. An inner circumferential surface of the third steering shaft 25 is constructed with or includes multiple first splines. Each of the first splines extends in an axial direction of the third steering shaft 25. The multiple first splines are arranged/disposed along a circumferential direction of the third steering shaft 25. An outer peripheral surface of the steering assembly 22 is constructed with multiple second splines 223. Each of the second splines 223 extends in an axial direction of the steering assembly 22. The multiple second splines 223 are arranged along a circumferential direction of the steering assembly 22. The multiple first splines are meshed with the multiple second splines 223. In the description of the present disclosure, "multiple" means two or more. In this way, by arranging the multiple first splines and the multiple second splines 223 that are meshed with each other, the relative movement between the steering assembly 22 and the third steering shaft 25 in an axial direction of the steering assembly 22 is facilitated while implementing the function of transmitting the steering torque between the steering assembly 22 and the third steering shaft 25. The structure is simple and reliable.

In some embodiments of the present disclosure, referring to FIG. 21 to FIG. 31, the vehicle steering system 100 further includes a rotation angle limiting device 4. The rotation angle limiting device 4 is connected with the steering assembly 22. The rotation angle limiting device 4 defines a maximum rotation angle of the steering assembly 22 when the steering assembly 22 is at the decoupling position.

In an example shown in FIG. 21 to FIG. 31, the rotation angle limiting device 4 may include a rotating member 41 and a moving member 42. The rotating member 41 may be fixed to the second steering shaft 221. A spiral groove 411 and a first limiting structure 412 are arranged on the rotating member 41. The moving member 42 is movably mounted to the housing 1. A guide shaft 421 and a second limiting structure 422 are arranged on the moving member 42. The guide shaft 421 is movably fitted in the spiral groove 411. The rotating member 41 is rotatable or configured to rotate between a first limit position and a second limit position relative to the moving member 42. The first limiting structure 412 abuts against the second limiting structure 422 when the rotating member 41 is at the first limit position and the second limit position. Therefore, by arranging the rotation angle limiting device 4, a maximum rotation angle of the steering assembly 22 can be effectively defined when the steering assembly 22 is in the decoupling position, and the parts such as a clock spring (not shown in the figure) and an angle sensor (not shown in the figure) can be prevented from being damaged due to a random rotation of the rotating member 41. In an embodiment, the guide shaft 421 may be a pin shaft. However, the guide shaft is not limited thereto.

In some embodiments of the present disclosure, as shown in FIG. 3 to FIG. 10, the vehicle steering system 100 further includes a steering wheel and a steering gear. The steering gear is drive-connected to one of the first steering shaft 21 and the steering assembly 22, and the steering wheel is drive-connected to the other of the first steering shaft 21 and the steering assembly 22. In an example shown in FIG. 3 to FIG. 10, the steering gear may be drive-connected to the first steering shaft 21, and the steering wheel may be drive-connected to the second steering shaft 221. In this way, when the steering assembly 22 is in the coupling position, the steering wheel can be drive-connected to the steering gear, and the transmission unloading mechanism 3 can improve the connection reliability between the steering wheel and the steering gear. When the steering assembly 22 is in the decoupling position, the steering wheel can be decoupled from the steering gear, thereby facilitating the clutch between the steering wheel and the steering gear.

In a further embodiment of the present disclosure, with reference to FIG. 13 to FIG. 20, the vehicle steering system 100 further includes a feeling simulation structure 5. The feeling simulation structure 5 is connected with the steering assembly 22. When the steering assembly 22 is at the decoupling position, the feeling simulation structure 5 simulates the feeling when the steering assembly 22 was at the coupling position.

For example, when the driver controls the steering wheel of the vehicle to drive the steering assembly 22 to restore, the feeling simulation structure 5 can provide a torque opposite to the rotation direction of the steering assembly 22, so as to simulate the steering damping feeling. When the driver controls the steering wheel of the vehicle to drive the steering assembly 22 to turn, the feeling simulation structure 5 can provide the same torque as the rotation direction of the steering assembly 22, so as to simulate the restoring force. Moreover, when the feeling simulation structure 5 alternately rotates forward and backward at a high frequency, a function of vibration prompt can be realized, which can be used for simulating the vibration feeling or prompt the driver when there is the safety risk in the driving. When the vehicle travels on the road, the feeling simulation structure 5 can provide the road feeling simulation torque to the steering assembly 22. In this way, the feedback force of the vehicle steering system 100 on the vehicle road can be simulated in real time, and the driving condition of the vehicle can be effectively fed back, providing the driver with a more real feeling of the road and improving the vehicle maneuverability.

Therefore, by arranging the feeling simulation structure 5, the feel of the steering assembly 22 in the coupling position can be simulated realistically when the steering assembly 22 is in the decoupling position, such as the steering damping feeling, the restoring force, the road feeling simulation torque, and the like. When the vehicle steering system 100 is a steering-by-wire system, the risk of the traffic accident can be reduced and the driving safety can be improved. When the vehicle steering system 100 is a driving simulation system such as a steering system of a game vehicle, the game experience can be improved and the authenticity of simulation is ensured.

In a further embodiment of the present disclosure, as shown in FIG. 32 to FIG. 40, the vehicle steering system 100 further includes a steering wheel adjustment device 6. The steering wheel adjustment device 6 is connected to the clutch module 2. The steering wheel adjustment device 6 is configured to adjust a height and/or a pitch angle of the steering wheel. Therefore, the height and/or the pitch angle of the steering wheel can be adjusted to an appropriate position by arranging the steering wheel adjustment device 6, so as to meet the needs of different drivers for the height and/or the pitch angle of the steering wheel and effectively improve the driving comfort.

Figure 37:
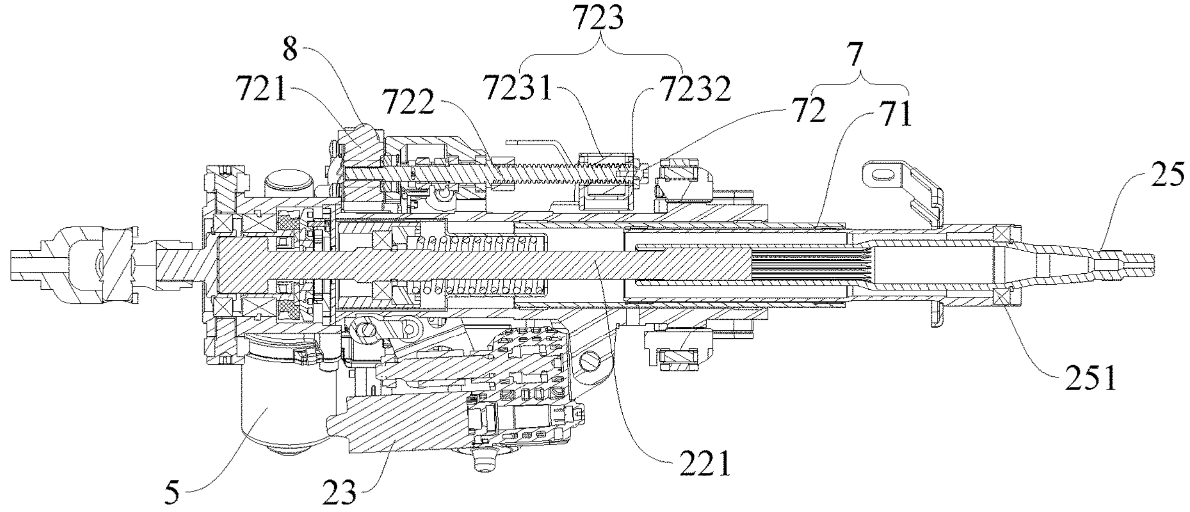
FIG. 37 is a partial cross-sectional view of a vehicle steering system according to an embodiment of the present disclosure, where a steering assembly is at a coupling position.
Figure 38:
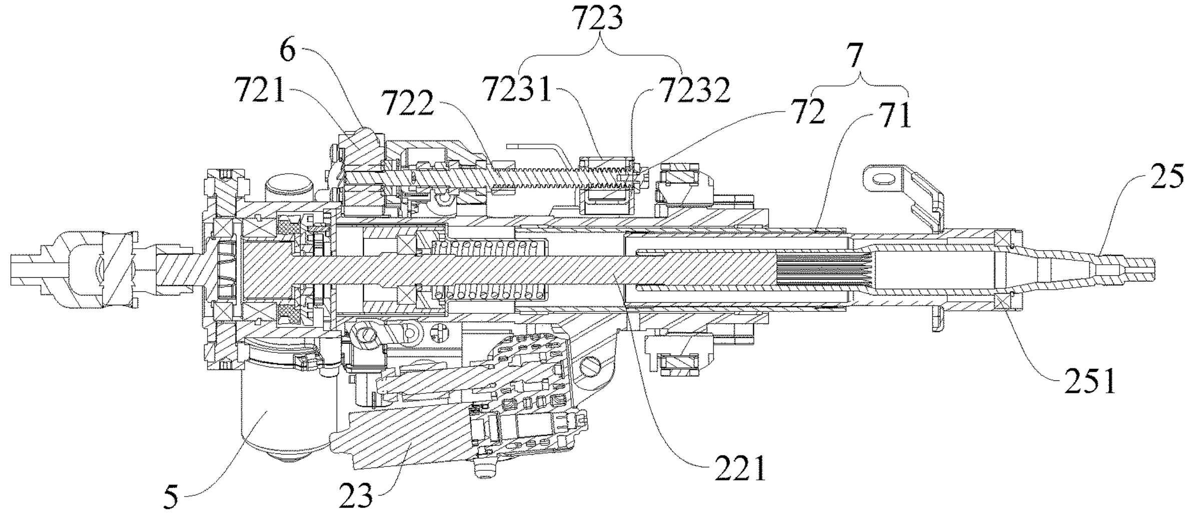
FIG. 38 is another partial cross-sectional view of a vehicle steering system according to an embodiment of the present disclosure, where a steering assembly is at a decoupling position.
Figure 39:
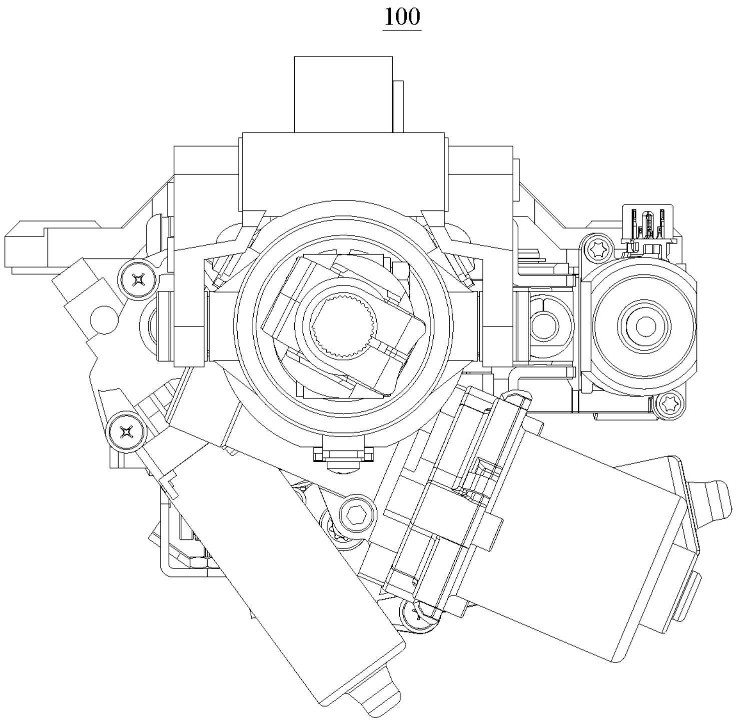
FIG. 39 is a partial schematic structural diagram of a vehicle steering system according to an embodiment of the present disclosure.

In some embodiments of the present disclosure, as shown in FIG. 37 and FIG. 38, the steering wheel is fixed to the third steering shaft 25. When the steering wheel adjustment device 6 is configured to adjust the height of the steering wheel at least, the steering wheel adjustment device 6 includes a steering wheel height adjustment device 7. The steering wheel height adjustment device 7 includes a slidable cylinder 71 and a height adjustment drive mechanism 72. In an embodiment, the slidable cylinder 71 is sleeved on the third steering shaft 25. The height adjustment drive mechanism 72 is connected with the slidable cylinder 71. The height adjustment drive mechanism 72 drives the third steering shaft 25 to move the steering wheel up and down through the slidable cylinder 71.

In an example shown in FIG. 37 and FIG. 38, one end of the third steering shaft 25 away from the second steering shaft 221 can be fixed to the slidable cylinder 71 through a bearing 251. When the height adjustment drive mechanism 72 is operated, the slidable cylinder 71 can be driven to move axially. The third steering shaft 25 can drive the steering wheel to move up and down under the driving of the slidable cylinder 71, thereby adjusting the height of the steering wheel. Therefore, by arranging the slidable cylinder 71 and the height adjustment drive mechanism 72, on the one hand, the height adjustment of the steering wheel can be realized, so that the driver can maintain a comfortable legroom, and a proper distance can be made between the driver and the steering wheel to ensure the driving comfort. On the other hand, a direct contact between the height adjustment drive mechanism 72 and the third steering shaft 25 can be eliminated, which can reduce the wear of the third steering shaft 25 and extend a service life of the third steering shaft 25.

In some embodiments of the present disclosure, referring to FIG. 34, FIG. 35, FIG. 37, and FIG. 38, the height adjustment drive mechanism 72 includes a height adjustment drive device 721, a height adjustment transmission member 722, and a height adjustment driving member 723. The height adjustment drive device 721 is fixed to the housing 1. The height adjustment transmission member 722 is drive-connected to the height adjustment drive device 721. The height adjustment driving member 723 is engaged with the height adjustment transmission member 722. The height adjustment driving member 723 is fixed to the slidable cylinder 71 to drive the slidable cylinder 71 to move up and down. As a result, such arranged height adjustment drive mechanism 72 has a reasonable structure, and can effectively transmit the driving force of the height adjustment drive device 721 to the slidable cylinder 71, thereby adjusting the height of the steering wheel. Moreover, the structure of the height adjustment drive mechanism 72 is relatively simple, the production difficulty can be reduced, and the space of the vehicle steering system 100 can be reasonably utilized.

Figure 40:
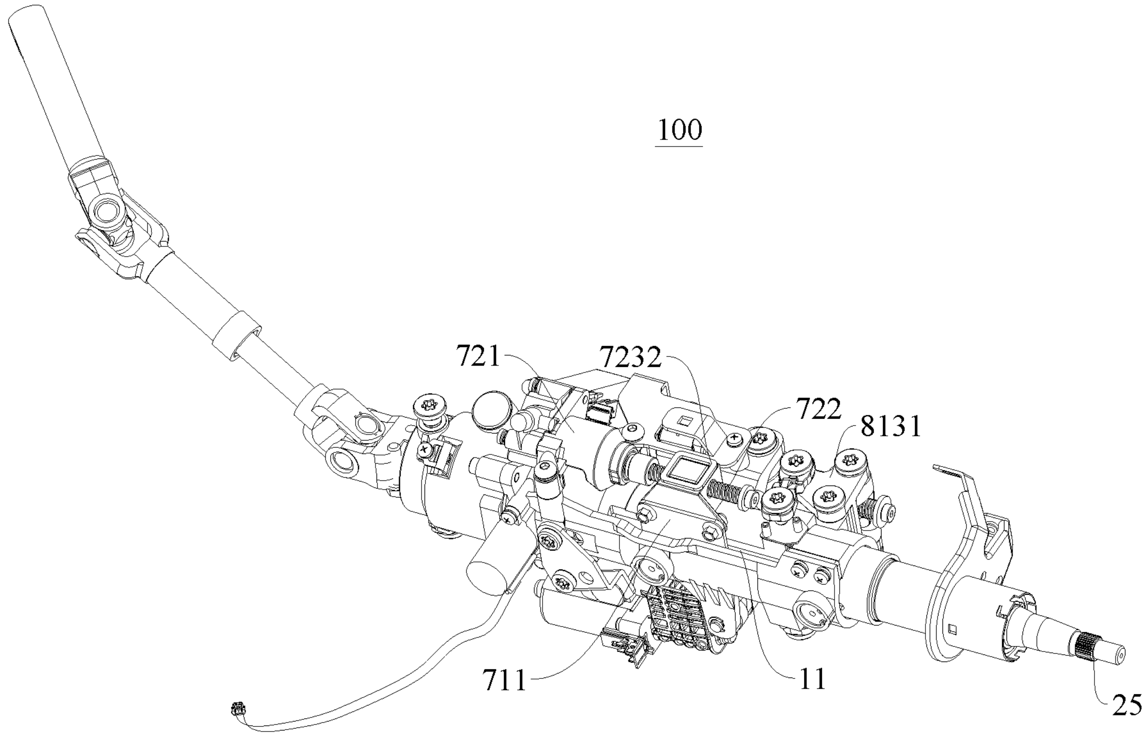
FIG. 40 is another schematic structural diagram of a vehicle steering system according to an embodiment of the present disclosure.

In some embodiments of the present disclosure, referring to FIG. 40, a sliding groove 11 extending in a vertical direction can be formed on the housing 1. An extension 711 movably fitted in the sliding groove 11 is arranged on the slidable cylinder 71. A free end of the extension 711 protrudes from the housing 1 and is fixed to the height adjustment driving member 723. For example, the extension 711 may be formed as a sheet structure. One end of the extension 711 is connected to the slidable cylinder 71, and the other end of the extension 711 can extend in a direction perpendicular to the axial direction of the slidable cylinder 71 and protrude from the sliding groove 11 to be connected to the height adjustment driving member 723. In this way, the connection and fixation between the slidable cylinder 71 and the height adjustment driving member 723 can be realized through the extension 711, so that the slidable cylinder 71 can move up and down under the driving of the height adjustment driving member 723. Moreover, by arranging the sliding groove 11, the width of the sliding groove 11 can be smaller while avoiding interference between the extension 711 and the housing 1 and causing the movement of the slidable cylinder 71 more stable and reliable. Therefore, impurities such as the external dust can be prevented from entering the interior of the housing 1 from the sliding groove 11, and a normal operation of the vehicle steering system 100 can be guaranteed.

In some embodiments of the present disclosure, as shown in FIG. 42, FIG. 43, and FIG. 45, the height adjustment transmission member 722 may be a height adjustment lead screw. The height adjustment lead screw extends in an up-down direction, and the height adjustment driving member 723 includes a height adjustment nut 7231. The height adjustment nut 7231 is sleeved on the height adjustment lead screw and in screw-thread fit with the height adjustment lead screw. The extension 711 is fixed to height adjustment nut 7231.

For example, the height adjustment drive device 721 may be a height adjustment motor. The height adjustment motor may have a motor output shaft, and the height adjustment lead screw may be drive-connected with the motor output shaft. When the height adjustment drive device 721 operates, the height adjustment lead screw may be driven to rotate. Since the height adjustment nut 7231 is in screw-thread fit with the height adjustment lead screw, the height adjustment nut 7231 may move in an axial direction of the height adjustment lead screw. Therefore, the slidable cylinder 71 and the third steering shaft 25 are driven to move in the axial direction (such as the up-down direction) of the height adjustment lead screw. In this way, by arranging the height adjustment lead screw and the height adjustment nut 7231, rotational movement of the height adjustment drive device 721 may be converted into linear movement of the height adjustment nut 7231. A direction in which the height adjustment nut 7231 drives the slidable cylinder 71 to move in a straight line may be controlled by controlling the rotation direction of the height adjustment drive device 721. Therefore, the extension and retraction of the third steering shaft 25 can be controlled more reliably, so as to adjust the height of the steering wheel.

In some embodiments of the present disclosure, referring to FIG. 40, the height adjustment driving member 723 includes a height adjustment base 7232. The height adjustment nut 7231 is fixed to the height adjustment base 7232, and the extension 711 is fixed to the height adjustment base 7232. Therefore, by arranging the height adjustment base 7232, the height adjustment nut 7231 can be effectively supported and protected by the height adjustment nut 7231 without direct contact with the extension 711, which can effectively prolong the service life of the height adjustment nut 7231, and make the engagement between the height adjustment nut 7231 and the height adjustment lead screw more reliable.

Figure 34:
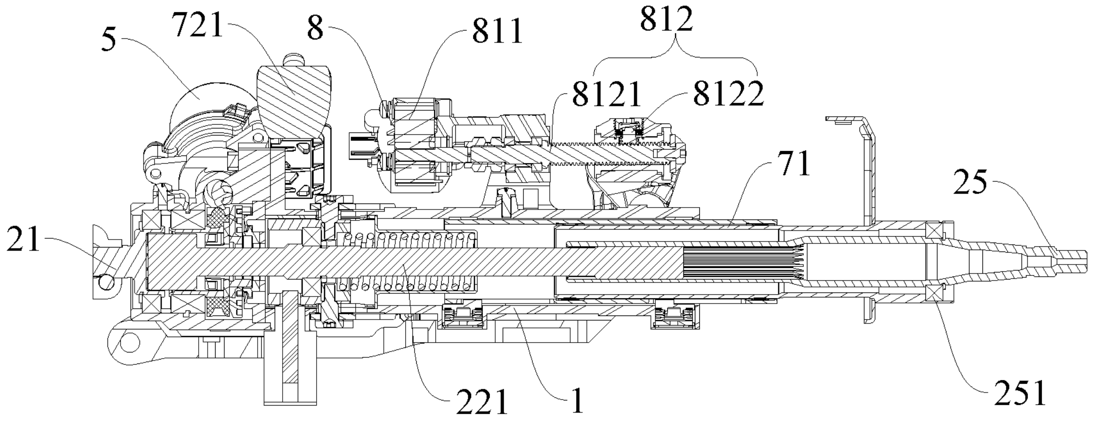
FIG. 34 is a partial cross-sectional view of a vehicle steering system according to an embodiment of the present disclosure, where a steering assembly is at a coupling position.
Figure 35:
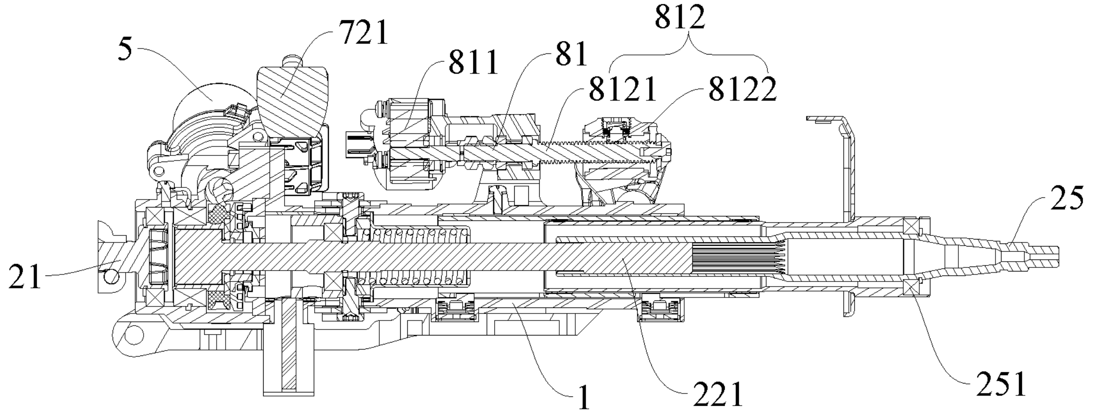
FIG. 35 is another partial cross-sectional view of a vehicle steering system according to an embodiment of the present disclosure, where a steering assembly is at a decoupling position.
Figure 36:
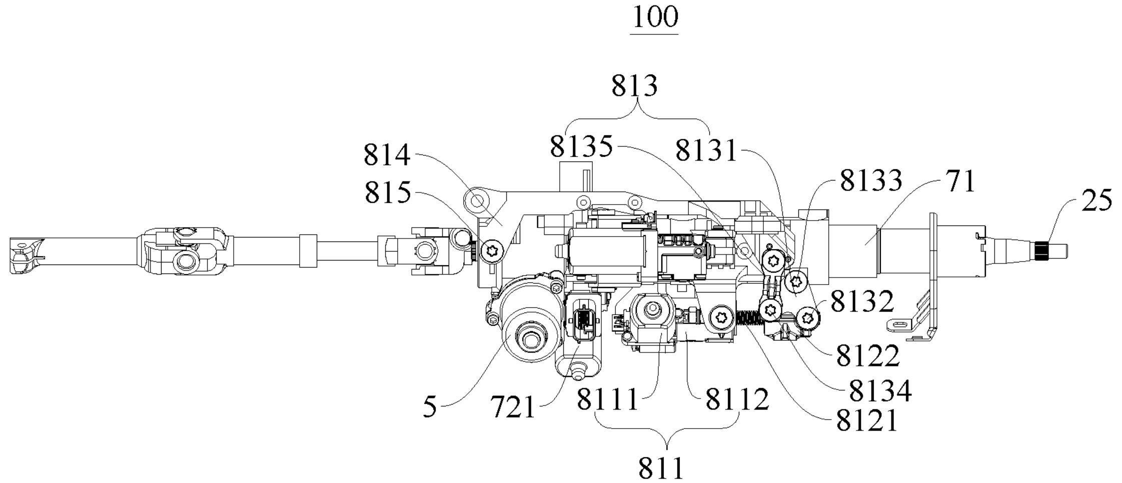
FIG. 36 is a schematic structural diagram of the vehicle steering system shown in FIG. 32 from yet another perspective.

In some embodiments of the present disclosure, as shown in FIG. 34 to FIG. 36, the housing 1 is sleeved on the third steering shaft 25, and the housing 1 is adapted to be hinged to the vehicle body of the vehicle. When the steering wheel adjustment device 6 is configured to adjust at least the pitch angle of the steering wheel, the steering wheel adjustment device 6 includes a steering wheel pitch angle adjustment device 8. The steering wheel pitch angle adjustment device 8 includes a pitching adjustment drive mechanism 81. The pitching adjustment drive mechanism 81 is connected to the housing 1 and the vehicle body. The pitching adjustment drive mechanism 81 drives, through the housing 1, the third steering shaft 25 to drive the steering wheel to perform pitching movement.

For example, in conjunction with FIG. 36, a lower end of the housing 1 may be hinged to the vehicle body, and a pitch hinge shaft 815 is arranged between the lower end of the housing 1 and the vehicle body. When the pitching adjustment drive mechanism 81 operates, the pitching adjustment drive mechanism 81 can drive the upper end of the housing 1 to rotate relative to the vehicle body about the pitch hinge shaft 815, thereby driving the third steering shaft 25 and the steering wheel to perform pitching movement. Therefore, by arranging the pitch drive mechanism 23, the steering wheel can be adjusted to a proper pitch angle so that the driver can hold the steering wheel and have a comfortable driving posture, and the driving safety can be improved while ensuring the driving comfort.

In some embodiments of the present disclosure, referring to FIG. 34 to FIG. 36, the pitching adjustment drive mechanism 81 includes a pitching adjustment drive device 811, a pitching adjustment transmission mechanism 812, and a pitching adjustment connecting rod mechanism 813. In an embodiment, the pitching adjustment drive device 811 is hinged to the housing 1, the pitching adjustment transmission mechanism 812 is drive-connected to the pitching adjustment drive device 811, and the pitching adjustment connecting rod mechanism 813 is hinged to the pitching adjustment transmission mechanism 812, the housing 1, and the vehicle body.

In an example shown in FIG. 36, the pitching adjustment drive device 811 may include a pitching adjustment driving motor 8111 and a motor base 8112. The pitching adjustment driving motor 8111 is fixed to the motor base 8112. The motor base 8112 is hinged to the housing 1. In this way, the structure of the pitching adjustment drive mechanism 81 is simple and reasonable, which is conducive to the transmission of the driving force, so that the driving force outputted by the pitching adjustment drive device 811 can be transmitted to the pitching adjustment connecting rod mechanism 813 through the pitching adjustment transmission mechanism 812. Finally, the pitching adjustment connecting rod mechanism 813 drives the housing 1 to perform pitching movement. Moreover, the pitching adjustment connecting rod mechanism 813 can cause the force transmission more accurate and reliable, so that the reliable adjustment of the pitch angle of the steering wheel can be realized. In addition, the pitching movement direction of the housing 1 can be controlled by controlling the rotation direction of the pitching adjustment drive device 811, which is very convenient.

In some embodiments of the present disclosure, referring to FIG. 34 to FIG. 36, the pitching adjustment transmission mechanism 812 includes a pitching adjustment lead screw 8121 and a pitching adjustment nut 8122. The pitching adjustment lead screw 8121 is drive-connected to the pitching adjustment drive device 811. The pitching adjustment nut 8122 is sleeved on the pitching adjustment lead screw 8121 and is threaded to the pitching adjustment lead screw 8121. The pitching adjustment connecting rod mechanism 813 is hinged to the pitching adjustment nut 8122. Therefore, when the pitching adjustment drive device 811 operates, the pitching adjustment lead screw 8121 can be driven to rotate. Since the pitching adjustment lead screw 8121 is threaded to the pitching adjustment nut 8122, the pitching adjustment nut 8122 can move in the axial direction of the pitching adjustment lead screw 8121, thereby driving the pitching adjustment connecting rod mechanism 813 to drive the housing 1 to perform pitching movement. Moreover, the pitching adjustment transmission mechanism 812 has a higher transmission efficiency, a simpler structure, and a lower cost.

In some embodiments of the present disclosure, as shown in FIG. 36, the pitching adjustment connecting rod mechanism 813 includes a first connecting rod 8131 and a second connecting rod 8135. The first connecting rod 8131 has a first pitching adjustment hinge point 8132, a second pitching adjustment hinge point 8133, and a third pitching adjustment hinge point 8134. The first pitching adjustment hinge point 8132 is hinged to the pitching adjustment nut 8122. The second pitching adjustment hinge point 8133 is hinged to the housing 1. One end of the second connecting rod 8135 is hinged to the third pitching adjustment hinge point 8134, and the other end of the second connecting rod 8135 is hinged to the vehicle body.

For example, in conjunction with FIG. 36, the second pitching adjustment hinge point 8133 is hinged to an upper portion of the housing 1. When the pitching adjustment nut 8122 moves along the axis of the pitching adjustment lead screw 8121, the first pitching adjustment hinge point 8132 moves along with the pitching adjustment nut 8122. Since a distance between the first pitching adjustment hinge point 8132 and the second pitching adjustment hinge point 8133 is fixed, the first connecting rod 8131 can drive the housing 1 to rotate about the pitch hinge shaft 815 through the second pitching adjustment hinge point 8133, and the third pitching adjustment hinge point 8134 swings about the other end of the second connecting rod 8135 (that is, an end of the second connecting rod 8135 that is hinged to the vehicle body). Therefore, by arranging the first connecting rod 8131 and the second connecting rod 8135, the first connecting rod 8131 and the second connecting rod 8135 can convert the linear movement of the pitching adjustment nut 8122 along the pitching adjustment lead screw 8121 into the pitching movement of the housing 1, so as to realize the adjustment of the pitch angle of the steering wheel and ensure the driving comfort of the driver.

In an embodiment, as shown in FIG. 36, a shape formed by the first pitching adjustment hinge point 8132, the second pitching adjustment hinge point 8133, and the third pitching adjustment hinge point 8134 may be an acute triangle. In this way, an occupied space of the second connecting rod 8135 is small, so that the structure of the steering wheel pitch angle adjustment device 8 is more compact, which is beneficial to the arrangement of other parts of the vehicle steering system 100. Certainly, the shape formed by the first pitching adjustment hinge point 8132, the second pitching adjustment hinge point 8133, and the third pitching adjustment hinge point 8134 may also be other shapes such as an obtuse triangle, which is not limited in the present disclosure.

In a further embodiment of the present disclosure, referring to FIG. 36, the pitching adjustment drive mechanism 81 may further include a fixed seat 814, where the fixed seat 814 is configured to be fixed to the vehicle body, and the housing 1 and the pitching adjustment connecting rod mechanism 813 are respectively hinged to the fixed seat 814. In an example shown in FIG. 36, a lower end of the fixed seat 814 is hinged to the lower end of the housing 1 through the pitch hinge shaft 815, and an upper end of the fixed seat 814 is hinged to the other end of the second connecting rod 8135. When the pitching adjustment drive device 811 is in operation, the pitching adjustment nut 8122 can drive the first hinge point to move along the axial direction of the pitching adjustment lead screw 8121, thereby driving the upper end of the housing 1 to swing around the pitch hinge shaft 815 relative to the fixed seat 814. Therefore, by arranging the fixed seat 814, the mounting of the entire steering wheel pitch angle adjustment device 8 is facilitated. One end of the housing 1 may be hinged to the fixed seat 814, and the other end of the housing 1 may perform pitching movement relative to the fixed seat 814, thereby facilitating the adjustment of the pitch angle of the steering wheel.

In the vehicle steering system 100 according to the embodiments of the present disclosure, on the one hand, by arranging the clutch module 2, the steering assembly 22 of the clutch module 2 is movable between the coupling position that is coupled to the first steering shaft 21 and transmits the steering torque and the decoupling position that is decoupled from the first steering shaft 21 and disconnects the transmission of the steering torque, so that the vehicle steering system 100 has a clutch function, and the transmission unloading mechanism 3 can cause the coupling between the steering assembly 22 and the first steering shaft 21 closer, which can improve the safety of the vehicle.

On the other hand, by arranging the rotation angle limiting device 4, the rotation angle limiting of the steering assembly 22 can be realized when the steering assembly 22 is in the decoupling position, so as to avoid damages to parts such as the clock spring and the angle sensor due to the random rotation of the steering assembly 22.

In a yet another aspect, the feeling simulation structure 5 is arranged/configured to simulate the real driving feeling such as the steering damping feeling, the restoring force, and the road feel simulation torque, and may also provide a vibration prompt in case of a safety risk during driving, thereby providing the driver with vibration feeling and effectively improving the driving safety.

In still another aspect, by arranging the steering wheel adjustment device 6, the steering wheel adjustment device 6 may be configured to adjust a height and/or a pitch angle of the steering wheel, so as to accordingly adjust the position of the steering wheel according to driving demands of different drivers, thereby effectively improving the driving comfort of the driver.

Based on the above, the vehicle steering system 100 according to the embodiment of the present disclosure has a clutch function, a feeling simulation function, a rotation angle limiting function, and a steering wheel adjustment function, and has advantages such as strong applicability and good user experience.

The vehicle (not shown in the figure) according to an embodiment of the present disclosure includes the vehicle steering system 100 according to any of the above embodiments of the present disclosure.

In the vehicle according to an embodiment of the present disclosure, by using the vehicle steering system 100, the tightness of the coupling of the steering assembly 22 and the first steering shaft 21 can be ensured when the steering assembly 22 is in the coupling position, which causes the vehicle performance more excellent, the steering response speed is faster, and the safety of the vehicle can be effectively improved.

Other configurations and operations of the vehicle steering system 100 and the vehicle having the same according to the embodiments of the present disclosure are known to those of ordinary skill in the art and will not be described in detail herein.

In the description of the present disclosure, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure.

In the description of the present disclosure, the terms "first feature", "second feature", "third feature", and "fourth feature" may include one or more of these features.

In the description of the present disclosure, the first feature is "on" or "under" the second feature may include that the first and second features are in direct contact, or may include that the first and second features are not in direct contact but in contact by using other features therebetween.

In the description of the present disclosure, the first feature is "on", "above", or "over" the second feature includes that the first feature is right above and on the inclined top of the second feature or merely indicates that a level of the first feature is higher than that of the second feature.

In the descriptions of this specification, descriptions using reference terms "an embodiment", "some embodiments", "an exemplary embodiment", "an example", "a specific example", or "some examples" mean that specific characteristics, structures, materials, or features described with reference to the embodiment or example are included in at least one embodiment or example of the present disclosure. In this specification, descriptions of the foregoing terms do not necessarily refer to the same embodiment or example.

Although the embodiments of the present disclosure have been shown and described, a person of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A vehicle steering system, comprising:

a housing;

a clutch module, wherein the clutch module comprises a first steering shaft, a steering assembly, and a drive mechanism; at least a part of the first steering shaft and at least a part of the steering assembly are disposed in the housing; the steering assembly is configured to move between a coupling position and a decoupling position; the steering assembly is coupled with the first steering shaft at the coupling position and transmits a torque; and the steering assembly is decoupled from the first steering shaft at the decoupling position and stops the transmission of the torque; and a transmission unloading mechanism, wherein the transmission unloading mechanism is configured to be connected with the drive mechanism and the housing; the drive mechanism is connected with the steering assembly through the transmission unloading mechanism; the drive mechanism drives the steering assembly to move between the coupling position and the decoupling position through the transmission unloading mechanism; and the transmission unloading mechanism unloads a limiting force of the drive mechanism on a position of the steering assembly when the steering assembly is driven by the drive mechanism to be at the coupling position, wherein the transmission unloading mechanism comprises:

a first adjusting connecting rod, wherein a first end of the first adjusting connecting rod is connected with the drive mechanism; and a second end of the first adjusting connecting rod is hinged to the steering assembly;

a second adjusting connecting rod, wherein a first end of the second adjusting connecting rod is connected with the drive mechanism; and a second end of the second adjusting connecting rod is hinged to the steering assembly; and a longitudinal connecting rod, wherein a first end of the longitudinal connecting rod is hinged to the first adjusting connecting rod and the second adjusting connecting rod; a second end of the longitudinal connecting rod includes a kidney-shaped hole; and the second end of the longitudinal connecting rod is hinged to the housing through the kidney-shaped hole.

2. The system according to claim 1, wherein a distance between centers of circles at two ends of the kidney-shaped hole is greater than 2 mm.

3. The system according to claim 1, wherein the drive mechanism is hinged to the housing.

4. The system according to claim 1, wherein the steering assembly comprises:

a second steering shaft, wherein at least a part of the second steering shaft is disposed in the housing; the second steering shaft is coupled to the first steering shaft and transmits the torque when the steering assembly is at the coupling position; and the second steering shaft is decoupled from the first steering shaft and stops the transmission of the torque when the steering assembly is at the decoupling position; and a clutch cylinder, wherein the clutch cylinder is sleeved on the second steering shaft; and the transmission unloading mechanism is connected with the clutch cylinder.

5. The system according to claim 1, wherein a first hinge shaft is disposed between the second end of the first adjusting connecting rod and the steering assembly; a second hinge shaft is disposed between the second end of the second adjusting connecting rod and the steering assembly; and a line connecting a central axis of the first hinge shaft to a central axis of the second hinge shaft extends through a center of the clutch cylinder.

6. The system according to claim 1, wherein the clutch module further comprises:

an elastic member, wherein the elastic member acts on the steering assembly; and the steering assembly moves toward the first steering shaft under a combined action of the transmission unloading mechanism and the elastic member when the steering assembly is at the coupling position.

7. The system according to claim 1, wherein the clutch module further comprises:

a third steering shaft, wherein the steering assembly is connected with the third steering shaft; the steering assembly is coupled with the third steering shaft to transmit a steering torque; and the steering assembly is configured to move with respect to the third steering shaft between the coupling position and the decoupling position.

8. The system according to claim 7, wherein the third steering shaft comprises a cavity; the steering assembly extends into the cavity;

an inner circumferential surface of the third steering shaft comprises a plurality of first splines; each of the first splines extends in an axial direction of the third steering shaft; the first splines are disposed along a circumferential direction of the third steering shaft;

an outer peripheral surface of the steering assembly comprises a plurality of second splines; each of the second splines extends in an axial direction of the steering assembly; the second splines are disposed along a circumferential direction of the steering assembly; and the first splines are meshed with the second splines.

9. The system according to claim 1, further comprising:

a rotation angle limiting device, wherein the rotation angle limiting device is connected with the steering assembly; the rotation angle limiting device defines a maximum rotation angle of the steering assembly when the steering assembly is at the decoupling position.

10. The system according to claim 9, further comprising:

a feeling simulator, wherein the feeling simulator is connected with the steering assembly; and in response to that the steering assembly is at the decoupling position, the feeling simulator is configured to simulate a feeling as the steering assembly is at the coupling position.

11. The system according to claim 1, further comprising:

a steering wheel adjustment device, wherein the steering wheel adjustment device is connected with the clutch module; and the steering wheel adjustment device is configured to adjust a height and/or a pitch angle of a steering wheel.

12. The system according to claim 11, wherein the clutch module further comprises a third steering shaft; the steering assembly is connected with the third steering shaft; the steering assembly is coupled with in the third steering shaft to transmit a steering torque; the steering assembly is configured to move with respect to the third steering shaft between the coupling position and the decoupling position; and the steering wheel is fixed to the third steering shaft; and when the steering wheel adjustment device is configured to adjust at least a height of the steering wheel, the steering wheel adjustment device comprises a steering wheel height adjustment device; and the steering wheel height adjustment device comprises:

a slidable cylinder, wherein the slidable cylinder is sleeved on the third steering shaft; and a height adjustment drive mechanism, wherein the height adjustment drive mechanism is connected with the slidable cylinder; and the height adjustment drive mechanism drives the third steering shaft to drive the steering wheel to move up and down through the slidable cylinder.

13. The system according to claim 12, wherein the height adjustment drive mechanism comprises:

a height adjustment drive device, wherein the height adjustment drive device is fixed to the housing;

a height adjustment transmission member, wherein the height adjustment transmission member is connected with the height adjustment drive device; and a height adjustment driving member, wherein the height adjustment driving member fits in with the height adjustment transmission member; and the height adjustment driving member is fixed to the cylinder to drive the cylinder to move up and down.

14. The system according to claim 11, wherein the clutch module comprises a third steering shaft; the housing is sleeved on the third steering shaft; the housing is configured to be hinged to a vehicle body of the vehicle; the steering assembly is connected with the third steering shaft; the steering assembly fits in with the third steering shaft to transmit a steering torque; the steering assembly is configured to move between the coupling position and the decoupling position relative to the third steering shaft; the steering wheel is fixed to the third steering shaft;

when the steering wheel adjustment device is configured to adjust at least a pitch angle of the steering wheel, the steering wheel adjustment device comprises a steering wheel pitch angle adjustment device, and the steering wheel pitch angle adjustment device comprises:

a pitching adjustment drive mechanism, wherein the pitching adjustment drive mechanism is connected with the housing and the vehicle body; and the pitching adjustment drive mechanism drives, through the housing, the third steering shaft to drive the steering wheel to perform pitching movement.

15. The system according to claim 14, wherein the pitching adjustment drive mechanism comprises:

a pitching adjustment drive device, wherein the pitching adjustment drive device is hinged to the housing;

a pitching adjustment transmission mechanism, wherein the pitching adjustment transmission mechanism is connected with the pitching adjustment drive device; and a pitching adjustment connecting rod mechanism, wherein the pitching adjustment connecting rod mechanism is hinged to the pitching adjustment transmission mechanism, the housing, and the vehicle body.

16. The system according to claim 15, wherein the pitching adjustment drive mechanism further comprises:

a fixed seat, wherein the fixed seat is configured to be fixed to the vehicle body; and the housing and the pitching adjustment connecting rod mechanism are hinged to the fixed seat.

17. The system according to claim 1, further comprising:

a steering gear, connected with one of the first steering shaft and the steering assembly; and a steering wheel, connected with the other of the first steering shaft and the steering assembly.

18. A vehicle, comprising a vehicle steering system, wherein the vehicle steering system comprises:

a housing;

a clutch module, wherein the clutch module comprises a first steering shaft, a steering assembly, and a drive mechanism; at least a part of the first steering shaft and at least a part of the steering assembly are disposed in the housing; the steering assembly is configured to move between a coupling position and a decoupling position; the steering assembly is coupled with the first steering shaft at the coupling position and transmits a torque; and the steering assembly is decoupled from the first steering shaft at the decoupling position and stops the transmission of the torque; and a transmission unloading mechanism, wherein the transmission unloading mechanism is configured to be connected with the drive mechanism and the housing; the drive mechanism is connected with the steering assembly through the transmission unloading mechanism; the drive mechanism drives the steering assembly to move between the coupling position and the decoupling position through the transmission unloading mechanism; and the transmission unloading mechanism unloads a limiting force of the drive mechanism on a position of the steering assembly when the steering assembly is driven by the drive mechanism to be at the coupling position, wherein the transmission unloading mechanism comprises:

a first adjusting connecting rod, wherein a first end of the first adjusting connecting rod is connected with the drive mechanism; and a second end of the first adjusting connecting rod is hinged to the steering assembly;

a second adjusting connecting rod, wherein a first end of the second adjusting connecting rod is connected with the drive mechanism; and a second end of the second adjusting connecting rod is hinged to the steering assembly; and a longitudinal connecting rod, wherein a first end of the longitudinal connecting rod is hinged to the first adjusting connecting rod and the second adjusting connecting rod; a second end of the longitudinal connecting rod includes a kidney-shaped hole; and the second end of the longitudinal connecting rod is hinged to the housing through the kidney-shaped hole.

* * * * *